United States Patent
Bakar

(10) Patent No.: US 9,819,531 B2
(45) Date of Patent: *Nov. 14, 2017

(54) PERSONAL VIDEO RECORDER WITH LIMITED ATTACHED LOCAL STORAGE

(71) Applicant: Google Inc., Mountain View, CA (US)

(72) Inventor: Majd Bakar, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/159,438

(22) Filed: May 19, 2016

(65) Prior Publication Data

US 2016/0285670 A1    Sep. 29, 2016

Related U.S. Application Data

(63) Continuation of application No. 13/788,472, filed on Mar. 7, 2013, now Pat. No. 9,379,932.

(51) Int. Cl.
| | | |
|---|---|---|
| G06F 15/16 | (2006.01) | |
| H04L 29/06 | (2006.01) | |
| H04N 21/258 | (2011.01) | |
| H04N 21/2747 | (2011.01) | |
| H04N 21/6587 | (2011.01) | |

(Continued)

(52) U.S. Cl.
CPC .... *H04L 29/06448* (2013.01); *H04L 65/4092* (2013.01); *H04L 67/1097* (2013.01); *H04L 67/32* (2013.01); *H04N 21/25875* (2013.01); *H04N 21/2747* (2013.01); *H04N 21/6587* (2013.01); *H04N 21/84* (2013.01)

(58) Field of Classification Search
CPC .... G06Q 20/3674; H04H 20/38; H04H 60/15; H04N 21/23; H04N 21/2747; H04N 21/4135; H04N 21/4147; H04N 21/4334; H04N 21/440245; H04N 21/4405; H04N 21/63345; H04N 21/8455; H04N 7/173
See application file for complete search history.

(56) References Cited

U.S. PATENT DOCUMENTS

| | | | |
|---|---|---|---|
| 8,302,144 B2 | 10/2012 | Birks et al. | |
| 8,588,590 B1 * | 11/2013 | Kotab | H04N 5/765 386/230 |
| 2005/0149481 A1 | 7/2005 | Hesselink et al. | |

(Continued)

FOREIGN PATENT DOCUMENTS

| | | |
|---|---|---|
| WO | WO 2005041455 | 5/2005 |
| WO | WO 2008002729 | 1/2008 |

OTHER PUBLICATIONS

International Preliminary Report on Patentability and Written Opinion dated Sep. 17, 2015 in International Patent Application PCT/US2014/021930.

(Continued)

*Primary Examiner* — Hamza Algibhah
*Assistant Examiner* — Anh Nguyen
(74) *Attorney, Agent, or Firm* — Byrne Poh LLP

(57) ABSTRACT

This disclosure generally relates to systems and methods that facilitate employing a server based content recording component for recording content remotely for a client content video recording device that has limited storage and limited number of content streams to which it can access concurrently, while satisfying content rules for broadcast and re-transmission.

20 Claims, 16 Drawing Sheets

(51) Int. Cl.
*H04N 21/84* (2011.01)
*H04L 29/08* (2006.01)

(56) References Cited

U.S. PATENT DOCUMENTS

| | | |
|---|---|---|
| 2006/0215988 A1 | 9/2006 | Tol et al. |
| 2007/0300249 A1 | 12/2007 | Smith et al. |
| 2007/0300269 A1 | 12/2007 | Roberts et al. |
| 2008/0028041 A1* | 1/2008 | Jung ................ H04L 65/4084 709/218 |
| 2009/0043906 A1* | 2/2009 | Hurst ............... H04N 21/23439 709/231 |
| 2009/0044233 A1 | 2/2009 | Brandt et al. |
| 2009/0198794 A1 | 8/2009 | Beals |
| 2009/0327247 A1 | 12/2009 | Jia et al. |
| 2010/0169977 A1 | 7/2010 | Dasher et al. |
| 2011/0135283 A1 | 6/2011 | Poniatowki et al. |
| 2012/0321278 A1 | 12/2012 | Walker et al. |

OTHER PUBLICATIONS

International Search Report dated Jul. 3, 2014 in International Patent Application No. PCT/US2014/021930.
Office Action dated Feb. 27, 2015 in U.S. Appl. No. 13/788,472.
Office Action dated Aug. 20, 2015 in U.S. Appl. No. 13/788,472.

\* cited by examiner

PERSONAL VIDEO RECORDER WITH LIMITED ATTACHED LOCAL STORAGE

CROSS-REFERENCE TO RELATED APPLICATIONS

This application is a continuation of U.S. patent application Ser. No. 13/788,472, filed Mar. 7, 2013, which is hereby incorporated by reference herein in its entirety.

TECHNICAL FIELD

This disclosure generally relates to systems and methods that facilitate employing a server based content recording component for recording content remotely for a client content video recording device that has limited storage and limited number of content streams to which it can access concurrently, while satisfying content rules for broadcast and re-transmission.

BACKGROUND OF THE INVENTION

As many content consumers' level of work and personal activity has increased, they are often unable to watch broadcast or streamed content at a time scheduled by a content provider. In order to allow more flexibility to consumers, content receiving devices (client devices) are now offered with a built-in personal video recorder (PVR), also known as a digital video recorder (DVR), that allows the consumer to record content for later viewing. Locally attached storage for storing this recorded content can be a significant added cost to the client device. For example, a cable set-top box that allows a consumer to record 80 hours of high definition content may require 200 gigabytes or more of local storage. Additionally, content rules for broadcast and re-transmission often require locally attached storage at the client device. Furthermore, a client device is generally limited in number of content streams to which it can access concurrently. For example, a typical cable set-top box may only have two tuners. As such, the cable set-top can only record two content streams concurrently. Adding more tuners to the client device would further increase cost of the client device.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

In accordance with a non-limiting implementation, an indication of a segment of a content stream to be recorded is detected; a snippet of the segment is recorded; and a representation of the snippet is sent to a content recording server as an indication for the content recording server to record the segment for the client device.

In accordance with a non-limiting implementation, a client recording component is configured to detect an indication of a segment of a content stream to be recorded; a client snippet extractor component is configured to record a snippet of the segment; and a client recording scheduler component is configured to send a representation of the snippet to a content recording server as an indication for the content recording server to record the segment for the client device.

In accordance with another non-limiting implementation, a representation is received of a snippet of a segment of a content stream to be recorded for a client device; a determination is made whether the client device has access to the segment of the content stream based upon the representation of the snippet; and in response to determining that the client device has access to the segment, the segment is recorded for the client device.

In accordance with another non-limiting implementation a client interface component is configured to receive a representation of a snippet of a segment of a content stream to be recorded for a client device; and a server recording scheduler component is configured to: determine whether the client device has access to the segment of the content stream based upon the representation of the snippet; and in response to determining that the client device has access to the segment, recording the segment for the client device.

These and other implementations and embodiments are described in more detail below.

DETAILED DESCRIPTION

Overview

Figure 1A:
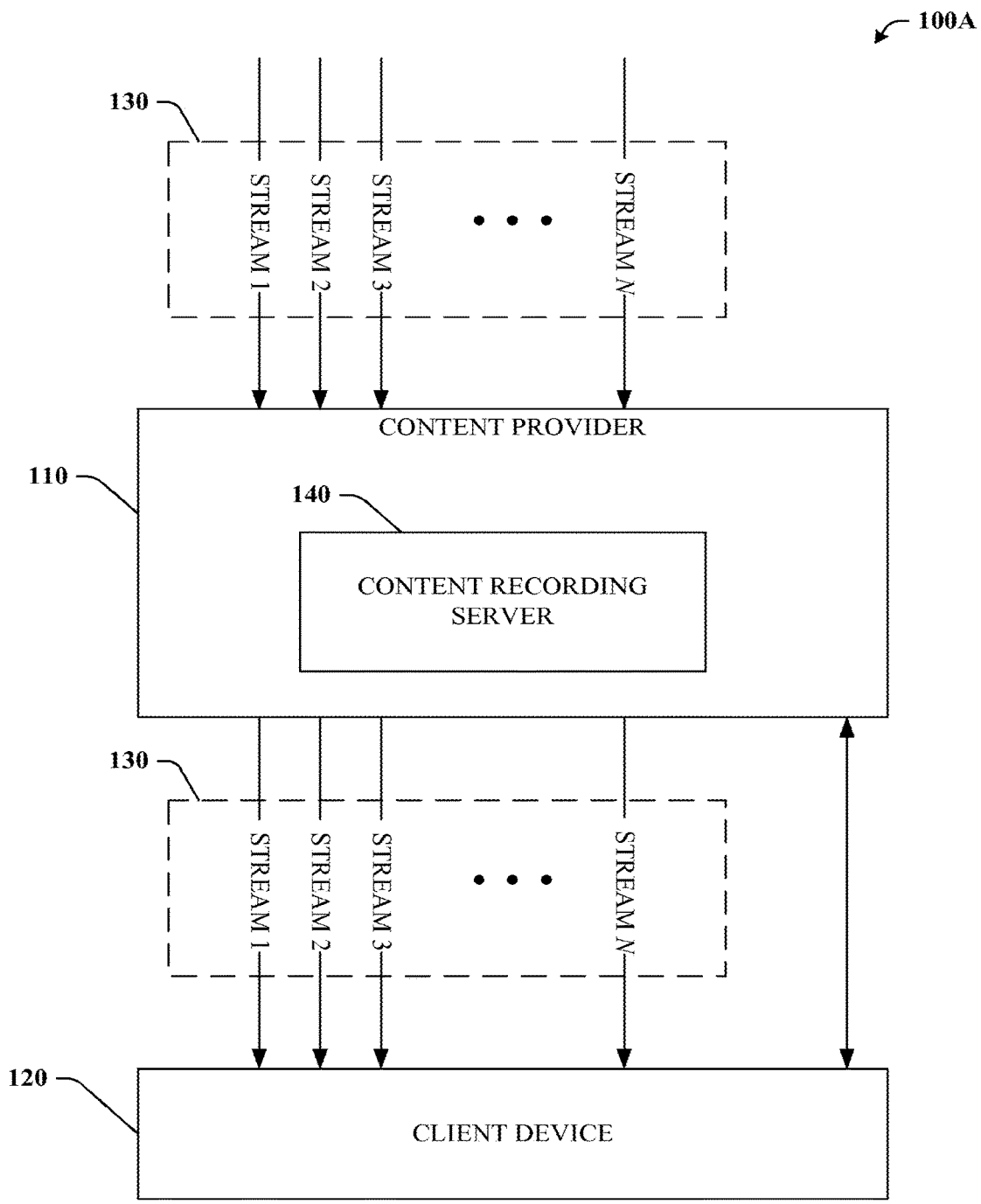
FIG. 1A illustrates a block diagram of an exemplary non-limiting system that records content (e.g. segment of a content stream) remotely at a content provider for a client device in accordance with an implementation of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of this disclosure may be practiced without these specific details, or with other methods, components, materials, etc. In other instances, well-known structures and devices are shown in block diagram form to facilitate describing this disclosure.

In situations in which the systems and methods discussed here collect personal information about users, or may make use of personal information, the users can be provided with an opportunity to control whether programs or features collect user information (e.g., information about a user's social network, social actions or activities, profession, a user's preferences, or a user's current location), or to control whether or how to receive content from the content server that may be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. The user can add, delete, or modify information about the user. Thus, the user can control how information is collected about the user and used by a server.

In accordance with various disclosed aspects, a mechanism is provided for a client device to interact with a server device to record broadcast or streamed content (e.g. a segment of a content stream) at the server device, while only temporarily recording snippets of the broadcast or streamed content at the client device. For example, a client device that is capable of receiving a plurality of streams of cable television content can receive an indication from a user to record a show. The client device can record a snippet of the show and send a signed client hash of the snippet, unique to the client device, to the server indicating that the server should record the show for the client device. Advantageously, the client device does not need to record the entire show, thus requiring much less locally attached storage. In a non-limiting example, a client device capable of storing 80 hours of high-definition content may require for example 200 gigabytes of local storage to record the content locally, versus employing snippets locally and recording the content remotely which may only require 2 gigabytes of local storage. As such, significant storage cost savings can be achieved at the client device. Moreover, having a smaller amount of locally attached storage and recording the snippet locally can still meet content rules for broadcast and re-transmission. The server can authenticate the signature and generate a corresponding server hash of the snippet from a server stored copy of the stream in which the show is broadcast. Upon matching the client hash to the corresponding server hash, the server can maintain a recording of the show for the client device or user that the user can access from the client device or another device from which the user is entitled to view the stored show. As the server is able to access and record all of the streams concurrently, recording the content on the server overcomes limitations on the client device of the number of content streams to which the client device can access and record concurrently.

Content (or content item) can include, for example, video, audio, image, text, or any combination thereof, non-limiting examples of which include, music, speeches, cartoons, short films, movies, televisions shows, radio transmissions, video conferences, advertisements, presentations, webcasts, games, any other creative work that can be captured and/or conveyed through video, audio, image, text, or any combination thereof. Content can be available on an intranet, internet, or can be local content.

With reference to the embodiments described below, an example content provider with content streams of video content is presented for illustrative purposed only. It is to be appreciated that any suitable type of content can be employed.

Referring now to the drawings, FIG. 1A depicts a system 100A that records content (e.g. segment of a content stream) remotely at a content provider for a client device. System 100A includes a content provider 110 that receives or accesses content on N content streams 130 (e.g. broadcast or content streams), where N is an integer. System 100A also includes a client device 120 that can receive or access the content on the N content streams 130 from content provider 110. Content provider 110 also includes a content recording server 140 that records content for client device 120. While only one content provider 110 and one client device 120 are shown, content provider 110 can interact with any number of client devices 120 concurrently, and client device 120 can interact with any number of content providers 110 concurrently. It is to be appreciated that content recording server 140 can concurrently record content for any number of client devices 120. Furthermore, content provider 110 and client device 120 can respectively receive input from users to control interaction with and presentation of content and associated information, for example, using input devices, non-limiting examples of which can be found with reference to FIG. 13.

Figure 13:
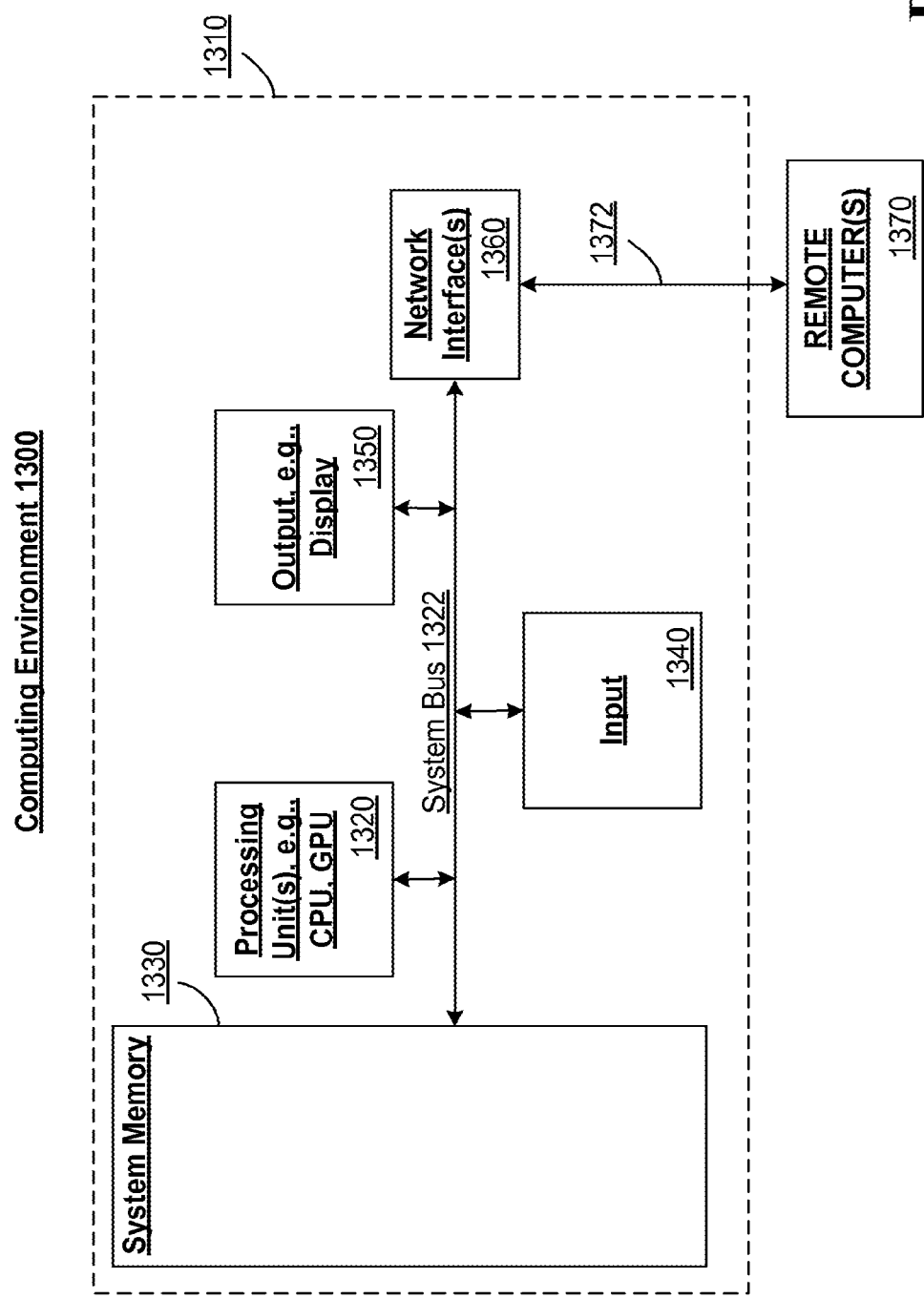
FIG. 13 illustrates a block diagram of an exemplary non-limiting computing system or operating environment in which the various embodiments can be implemented.

Content provider 110 and client device 120, each respectively include a memory that stores computer executable components and a processor that executes computer executable components stored in the memory, a non-limiting example of which can be found with reference to FIG. 13. Content provider 110 can communicate via a wired and/or wireless network with client device 120.

Figure 1B:
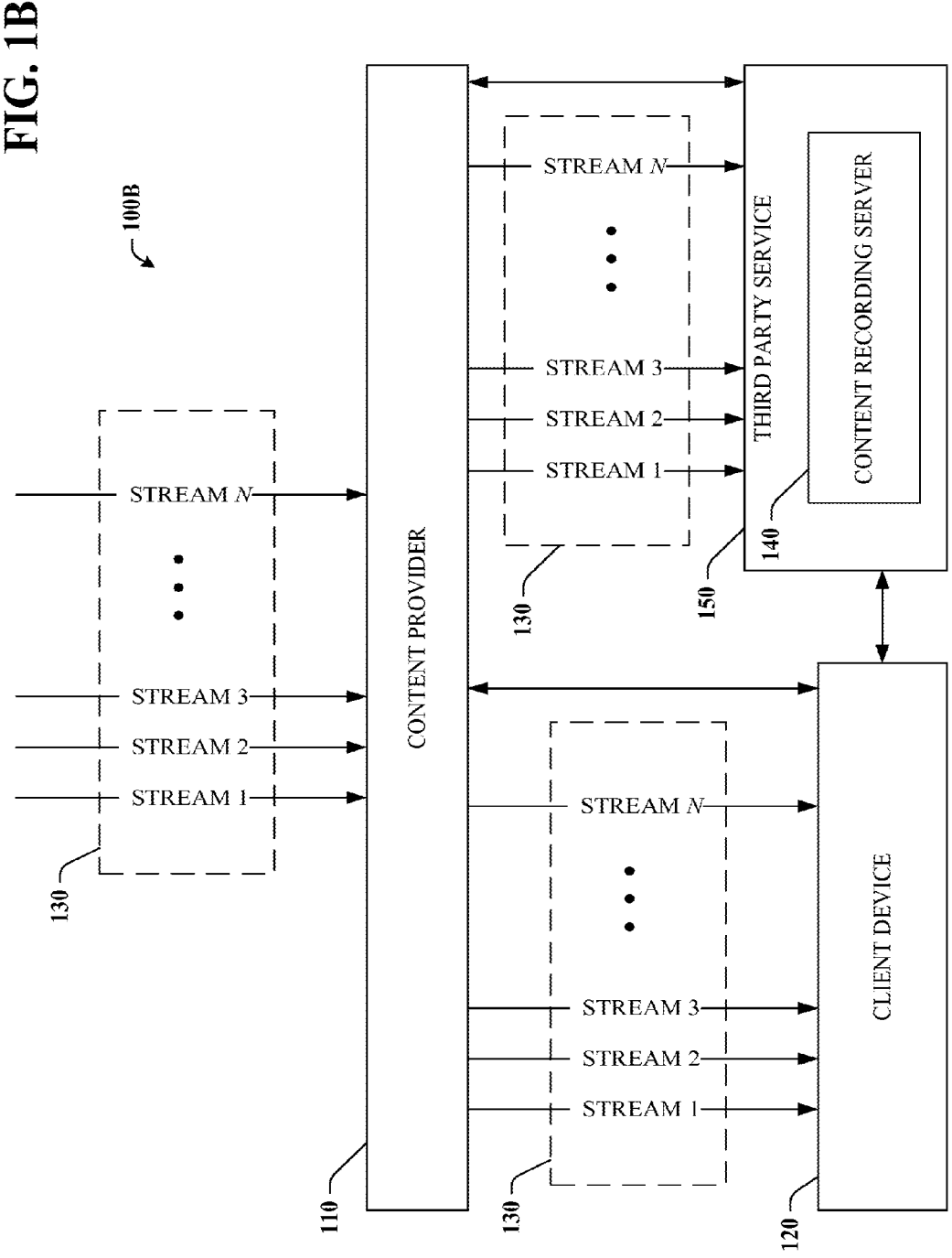
FIG. 1B illustrates a block diagram of an exemplary non-limiting system that records content remotely at a third party service for a client device that receives or accesses content from a content provider in accordance with an implementation of this disclosure.

Referring to FIG. 1B, another embodiment is depicted that records content remotely at a third party service for a client device that receives or accesses content from a content provider. System 100B includes a content provider 110 that receives or accesses content on N content streams 130 (e.g. broadcast or content streams), where N is an integer. System 100B also includes a client device 120 that can receive or access the content on the N content streams 130 from content provider 110. System 100B further includes a third party service 150 that can receive or access the content on the N content streams 130 from the content provider 110 from which the client device 120 receives or accesses the content on the N content streams 130. In another embodiment (not depicted), third party service 150 can receive or access the content on the N content streams 130 from a different content provider 110 than the content provider 110 from which the client device 120 receives or accesses the content on the N content streams 130. Third party service 150 also includes a content recording server 140 that records content for client device 120. While only one content provider 110, one third party service 150, and one client device 120 are shown, content provider 110 can interact with any number of client devices 120 or third party services 150 concurrently, client device 120 can interact with any number of content providers 110 or third party services 150 concurrently, and third party service 150 can interact with any number of content providers 110 or client devices 120 concurrently. It is to be appreciated that content recording server 140 can concurrently record content for any number of client devices 120. Furthermore, content provider 110, third party service 150, and client device 120 can respectively receive input from users to control interaction with and presentation of content and associated information, for example, using input devices, non-limiting examples of which can be found with reference to FIG. 13.

Content provider 110, third party service 150, and client device 120, each respectively include a memory that stores computer executable components and a processor that executes computer executable components stored in the memory, a non-limiting example of which can be found with reference to FIG. 13. Content provider 110, third party service 150, and client device 120 can communicate with each other via a wired and/or wireless network.

Client device 120 can be any suitable type of device for interacting with, receiving, accessing, or supplying content locally, or remotely over a wired or wireless communication link, non-limiting examples of include a wearable device or a non-wearable device. Wearable device can include, for example, heads-up display glasses, a monocle, eyeglasses, contact lens, sunglasses, a headset, a visor, a cap, a helmet, a mask, a headband, clothing, or any other suitable device that can be worn by a human or non-human user. Non-wearable device can include, for example, a mobile device, a mobile phone, a camera, a camcorder, a video camera, personal data assistant, laptop computer, tablet computer, desktop computer, server system, cable set top box, satellite set top box, cable modem, television set, monitor, media extender device, blu-ray device, DVD (digital versatile disc or digital video disc) device, compact disc device, video game system, portable video game console, audio/video receiver, radio device, portable music player, navigation system, car stereo, or any other suitable device. Moreover, content provider 110, third party service 150, and client device 120 can include a user interface (e.g., a web browser or application), that can receive and present displays and content generated locally or remotely.

Client Device

Figure 2:
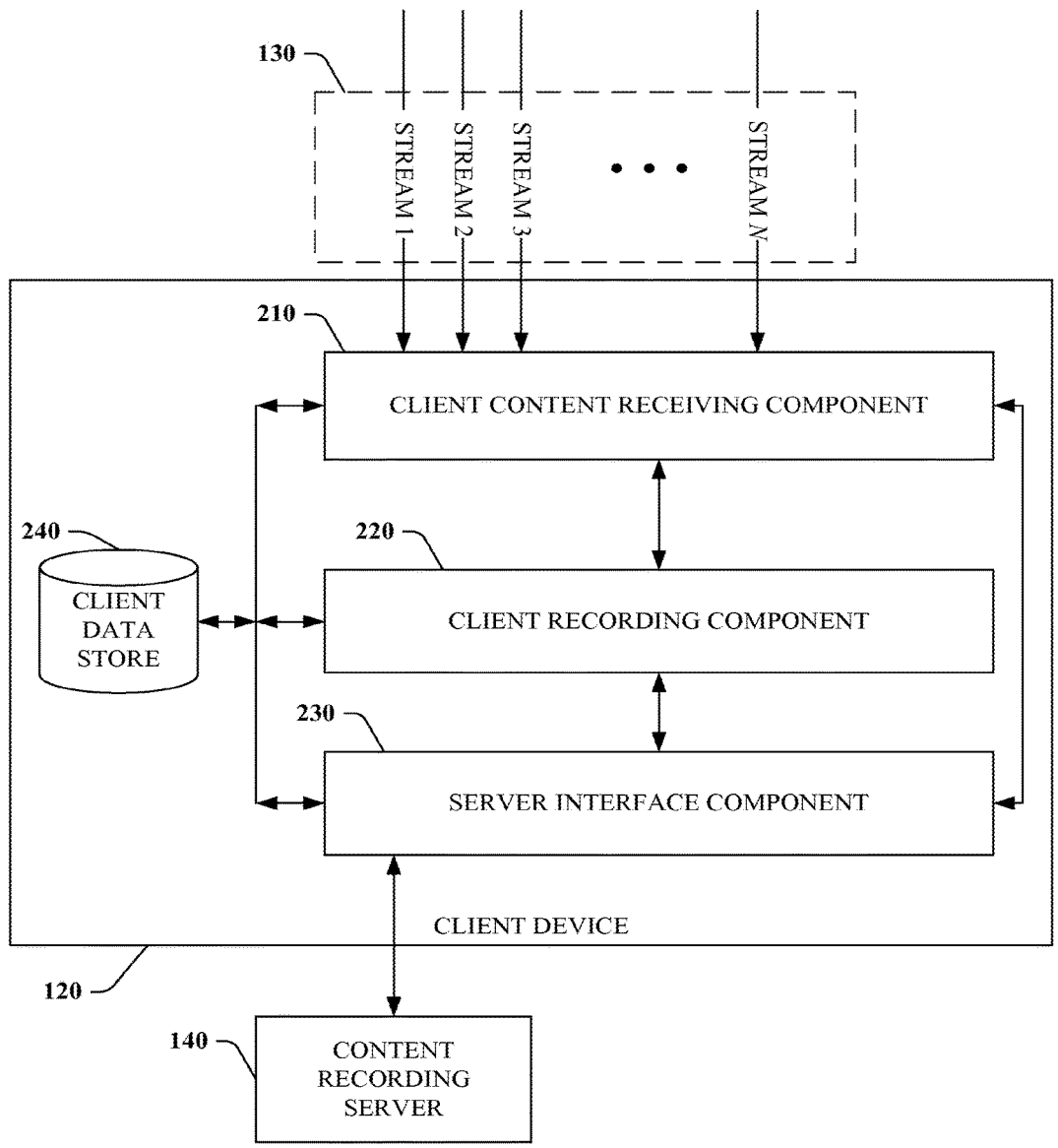
FIG. 2 illustrates a block diagram of an exemplary non-limiting client device that generates an indication to a content recording server to record a segment of a content stream for the client device in accordance with an implementation of this disclosure.

Referring to FIG. 2, client device 120 includes a client content receiving component 210 that receives or accesses content on N content streams 130. Client device 120 further includes client recording component 220 that manages recording of content from N content streams 130 for client device 120. In addition, client device 120 includes a server interface component 230 that interacts with content recording server 140 to send and/or receive information related to recording content remotely on content recording server 140 for client device 120. Additionally, client device 120 includes a client data store 240 that can store content, as well as, data generated or received by client device 120, client content receiving component 210, client recording component 220, and server interface component 230. Client data store 240 can be stored on any suitable type of storage device, non-limiting examples of which are illustrated with reference to FIGS. 12 and 13.

Figure 3:
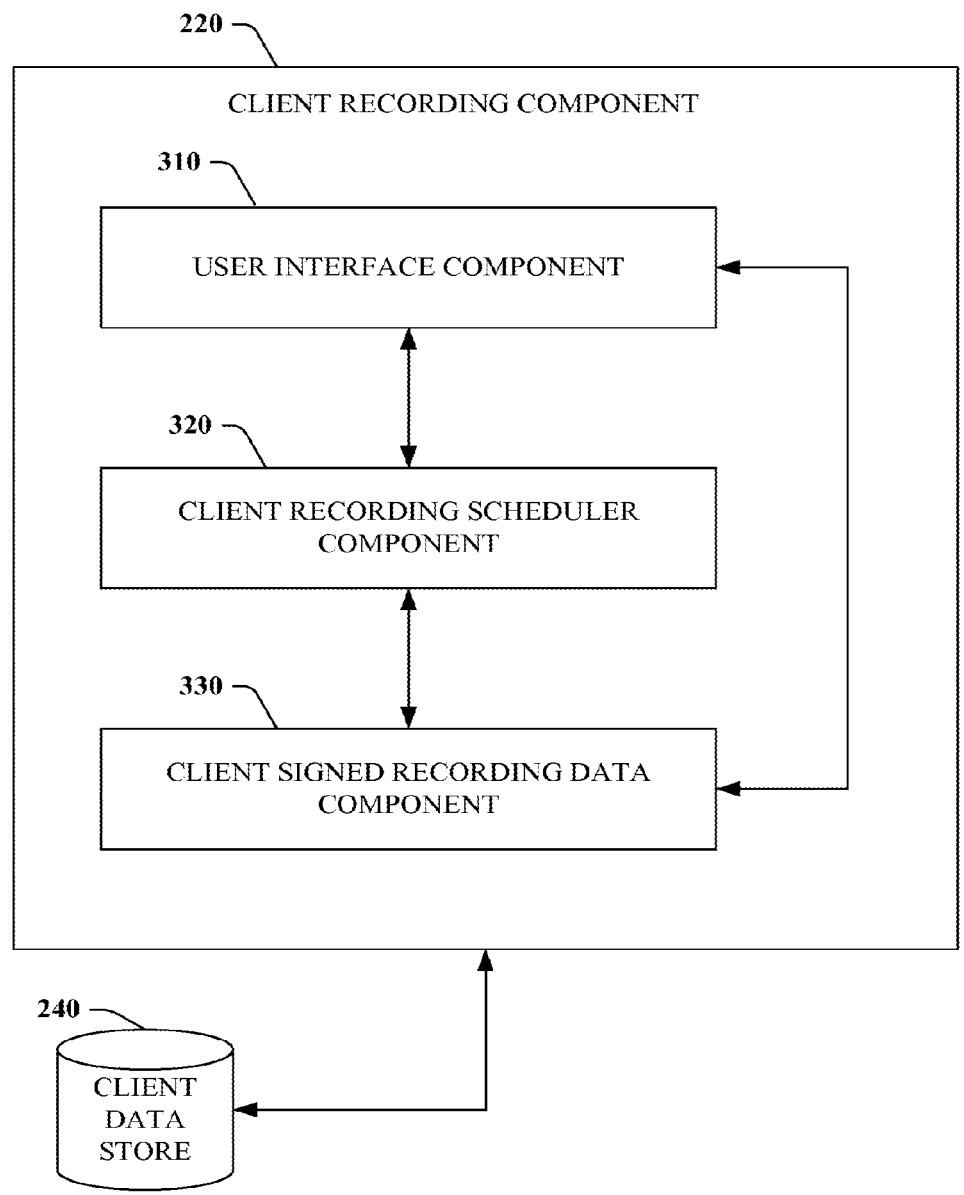
FIG. 3 illustrates a block diagram of an exemplary non-limiting client recording component that manages recording of content from a plurality of content streams for a client device in accordance with an implementation of this disclosure.

Referring to FIG. 3, client recording component 220 manages recording of content from N content streams 130 for client device 120. Client recording component 220 includes a user interface component 310 that receives user input related to initiating/terminating recording of content or scheduling recording of content. For example, a user may be watching a show and presses a button on a remote control (not shown) or other input device that interacts with user interface component 310 to initiate recording of the show. In another example, a user may employ the input device to schedule recording of a show in advance of broadcast of the show. In a further example, a user may employ the input device to terminate a recording that is in progress or scheduled. Devices and methods for a user to initiate, terminate, or schedule a recording using an input device are well known to those skilled in the art, and thus will not be described in detail here. Client recording component 220 also includes a client recording scheduler component 320 that manages the initiation, termination, or scheduling of recordings. For example, in response to user input indicating to initiate recording of content, client recording scheduler component 320 can initiate the process of recording the content. In another example, in response to user input indicating to terminate an in progress recording of content, client recording scheduler component 320 can terminate the process of recording the content. In a further example, client recording scheduler component 320 can initiate and/or terminate the process of recording content based upon a schedule of recording content established by the user. For example, at a beginning time indicated by the schedule, client recording scheduler component 320 can initiate the process of recording content, and at an ending time indicated by the schedule, client recording scheduler component 320 can begin a process to terminate the recording of the content. In addition, client recording component 220 includes a client signed recoding data component 330 that generates a signed recording data for instructing the content recording server 140 to initiate or terminate recording of a content.

Client recording scheduler component 320 initiates the process of recording content by instructing client signed recording data component 330 to generate signed recording data for instructing the content recording server 140 to initiate recording of the content.

Figure 4:
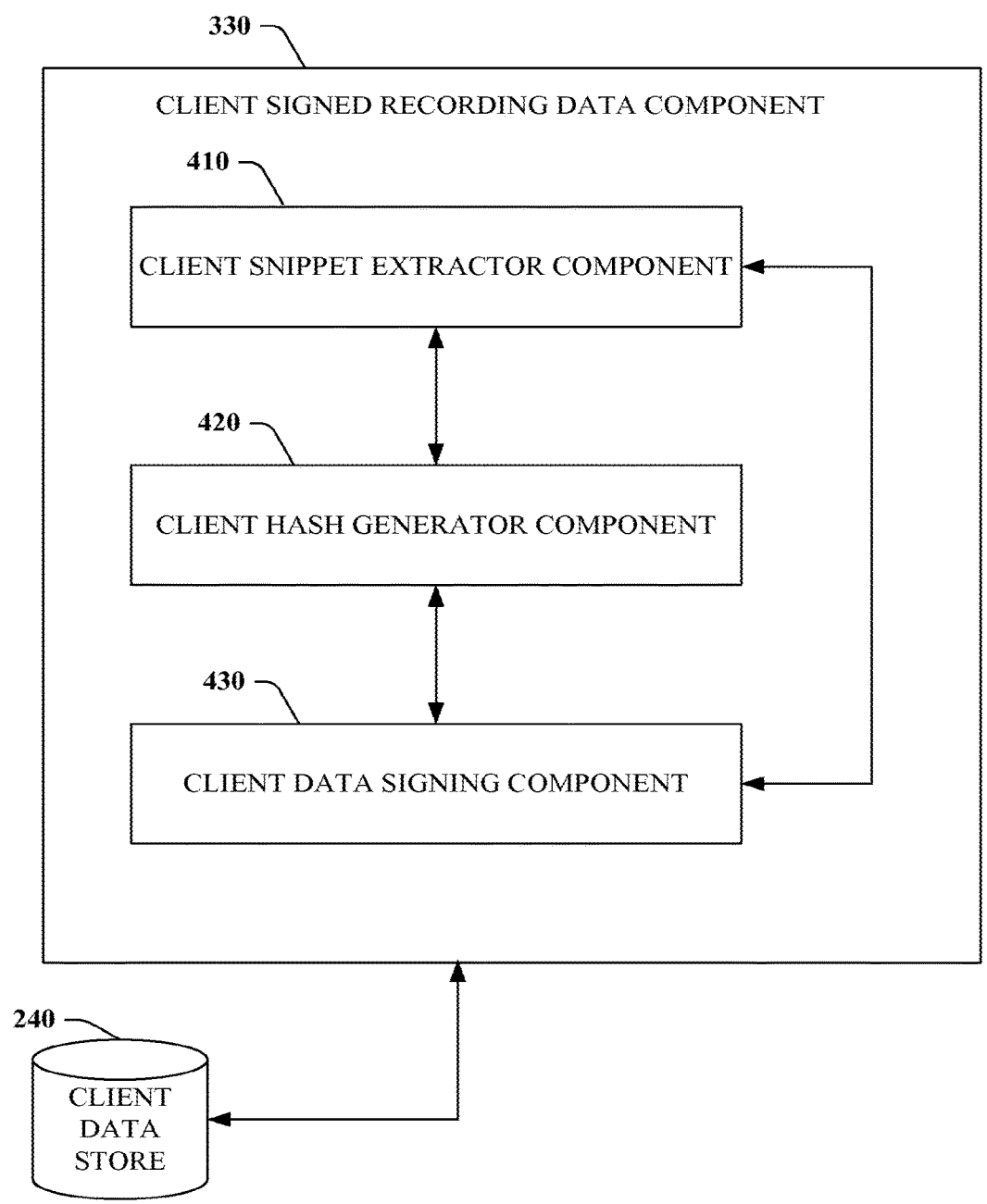
FIG. 4 illustrates a block diagram of an exemplary non-limiting client recording scheduler component that manages the initiation, termination, or scheduling of recordings for a client device in accordance with an implementation of this disclosure.

Referring to FIG. 4, client signed recoding data component 330 includes client snippet extractor component 410 that extracts a snippet of the content to be recorded. Client signed recording data component 330 also includes client hash generator component 420 generates a client hash (or fingerprint) of the extracted snippet. Client signed recording data component 330 also includes client data signing component 430 generates signed recording data from the client hash and/or other data related to instructing the content recording server 140 to initiate, continue, or terminate recording of a content.

In response to being instructed to generate signed recording data instructing the content recording server 140 to initiate or continue recording of a content, client signed recoding data component 330 instructs client snippet extractor component 410 to extract a snippet of the content to be recorded. A snippet is a small portion of the content of a predetermined length or size. It is to be appreciated that the snippet can be any predetermined length or size. However, the predetermined length or size should be as small as possible, while being long enough to generate a client hash that is sufficient for matching to a corresponding server hash on the content recording server in order to verify that the underlying content from which the hashes are generated are the same. In an embodiment, the snippet can have a predetermined length defined in terms of time. In a non-limiting example, the time can be generally on the order of a few seconds of content, such as 3 to 5 seconds. It is to be appreciated that any suitable length of time can be employed. In another embodiment, the snippet will have a predetermined length, such as in terms of data size. In a non-limiting example, the data size can be generally on the order of tens of megabytes of data, such as 50 to 150 megabytes. It is to be understood that any suitable data size can be employed. Additionally, it is to be appreciated that the underlying content to be recorded can be encoded using any suitable algorithm. However, the underlying content to be recorded on the client device 120 and the content recording server 140 must be encoded using the same coding algorithm in order to generate corresponding hashes for matching. Client hash generator component 420 then generates a client hash (or fingerprint) of the extracted snippet. Generating the client hash on the recorded snippet provides evidence that the client device 120 has access to the content to be recorded by content recording server 140. It is to be appreciated that any suitable algorithm for generating the client hash (or fingerprint) can be employed, but the same algorithm must be employed by the client device 120 and the content recording server 140 to enable matching. In a non-limiting example, the hash can be generated using cleartext encoding of the content.

Client data signing component 430 generates signed recording data from recording data that can include, for example, the client hash, data indicating the content stream, and the starting location and ending location of the snippet in the content stream, or an identifier of client device 120. For example, the content stream can be identified by the channel number or a station identifier, or any other suitable information for uniquely identifying the content stream. Furthermore, for example the content stream can have timestamps, counters, sequence number, frame number or any other suitable information that allows for uniquely identifying a location in the content stream. Client data signing component 430 signs the recording data with an authentication mechanism that is unique to the client device 120 to generate the signed recording data. For example, the recording data can be signed with a private key unique to the client device 120 that corresponds to a public key on the content recording server 140. It is to be appreciated that any suitable authentication mechanism can be employed for signing the recording data to generate signed recording data that is uniquely identifiable by content recorder server 140 as being from client device 120, non-limiting examples of which include Password-authenticated key agreement, Authentication and Key Agreement, Needham-Schroeder Symmetric Key, Needham-Schroeder Public-Key, Otway-Rees, Yahalom, Wide Mouth Frog, Kerberos, Diameter, Remote Authentication Dial In User Service (RADIUS), Cellular Authentication and Voice Encryption (CAVE), and Extensible Authentication Protocol. Signing the recording data with an authentication mechanism that is uniquely identifiable as being from the client device 120 provides protection against another device spoofing client device 120.

Optionally, as an additional security mechanism, recording data can include entitlement information associated with the client device and/or an account of a user associated with the client device that can be employed by content recording server 140 to verify that the client device and/or user account is authentic and has access to the content to be recorded. In a non-limiting example, entitlement information can include a client device identifier, user account identifier, username, or any other suitable information that can uniquely identify the client device, user, or user account. Additionally, a parameter can be set on the content recording server 140 that specifies whether entitlement information is required in the recording data. This parameter setting can be conveyed to client device 120. Recording data can also optionally include metadata associated with the content to be recorded. For example, content can have associated metadata describing the content. Any suitable metadata can be employed in connection with content. In a non-limiting example, metadata can include type of content, such as music, speeches, cartoons, short films, movies, televisions shows, radio transmissions, video conferences, advertisements, presentations, webcast, or games. Furthermore, metadata can include location information associated with the content, source of the content, type of device used to generate the content, formatting process employed to generate the content, or filters applied to the content. Additionally, metadata can include video, audio, image, or text parameters of the content. In a non-limiting example, a video recording can include title, year, language, description, cast, parental rating, length, video format, resolution, aspect ratio, audio format, etc. In another non-limiting example, a musical recording can include metadata such as source, title, artist, album, year, language, track genre, length, composer, lyrics, parental rating, album art, format, bit rate, sampling rate, bits per sample, number of content streams, audio codec, etc. One skilled in the art would readily recognize that, based on the type of content, there are well known metadata types that are conventionally associated. However, the information is not limited to only such traditional metadata types. Any suitable type of information can be associated with the content. The metadata can be employed by content recording server, for example, to assist in locating the content or a version of the content that matches the content associated with the snippet. For example, a user of client device 120 (e.g. a high definition set-top box may specify as part of scheduling a recording that they would like to have the content recording server 140 also record a version of the content that is suitable for another client device 120 (e.g. mobile phone) from which the user will play back the content.

Client recording scheduler component 320 instructs server interface component 230 to send the signed recording data to content recording server 140 instructing content recording server 140 to initiate recording of the content. In an embodiment, client recording scheduler component 320 will repeat the process to extract another snippet from another portion of the content to send signed recording data to content recording server 140 at predetermined intervals as an indication for content recording server 140 to continue recording of the content. The predetermined intervals can be of any suitable length. It is to be appreciated that the predetermine interval can be static or dynamically adjusted, for example based upon speed of a connection employed to communicate with client device, length of the content, or the type of client device, or any other suitable attribute associated with client device 120, content recording server 140, or content. Client recording scheduler component 320 can stop sending the signed recording data as an indication to content recording server 140 to terminate recording of the content. In another embodiment, the initial sending of the signed recording data is sufficient for content recording server 140 to continue recording of the content. Client recording scheduler component 320 will send signed recording data with a specific indication to content recording server 140 to terminate recording of the content. In a non-limiting example, the specific indication is signed recording data that does not include a client hash of a snippet of content. In another non-limiting example, the specific indication is signed recording data that has a recording termination parameter instructing content recording server 140 to terminate recording of the content.

It is to be appreciated that in another embodiment, client recording scheduler component 320 can instruct server interface component to send the recording data in a unsigned form, instead of signed recording data, to content recording server 140 instructing content recording server 140 to initiate, continue, or terminate recording of the content. For example, in a private network that is not accessible to unsecured devices, spoofing may not be a concern, and thus signing the recording data may not be necessary. In a non-limiting example, a parameter can be set on the content recording server 140 that specifies whether a signature is required for the recording data. This parameter setting can be conveyed to client device 120.

Client recording scheduler component 320 can manage recordings of multiple instances of content from a plurality of streams in parallel through multiplexing recording of snippets from the plurality of streams using the available content access mechanisms (e.g. tuners) on client device 120. As a simplified example where client device can only tune to a single content stream at a time, client recording scheduler component 320 can extract a snippet from a first content stream to generate first signed recording data, and then tune to a second content stream to extract another snippet to generate second signed recording data, and then tune to a Mth content stream to extract a further snippet to generate Mth signed recording data (where M is an integer), and then tune back to the first content stream to repeat the cycle for additional snippets. In this manner, Client recording scheduler component 320 can manage recording any number of content streams concurrently. Once recording data has been sent to content recording server 140, the corresponding snippet will not need to be maintained on the locally attached storage, thereby freeing up space for more snippets to be recorded. The limit on the number of content streams that can be concurrently recorded can depend for example, on the size of the snippets, the size of locally attached storage, the number of tuners, the speed at which a tuning (e.g. accessing or switching) to a content stream can take place, and the speed at which signed recorded data can be sent to content recording server 140.

Content Recording Server

Figure 5:
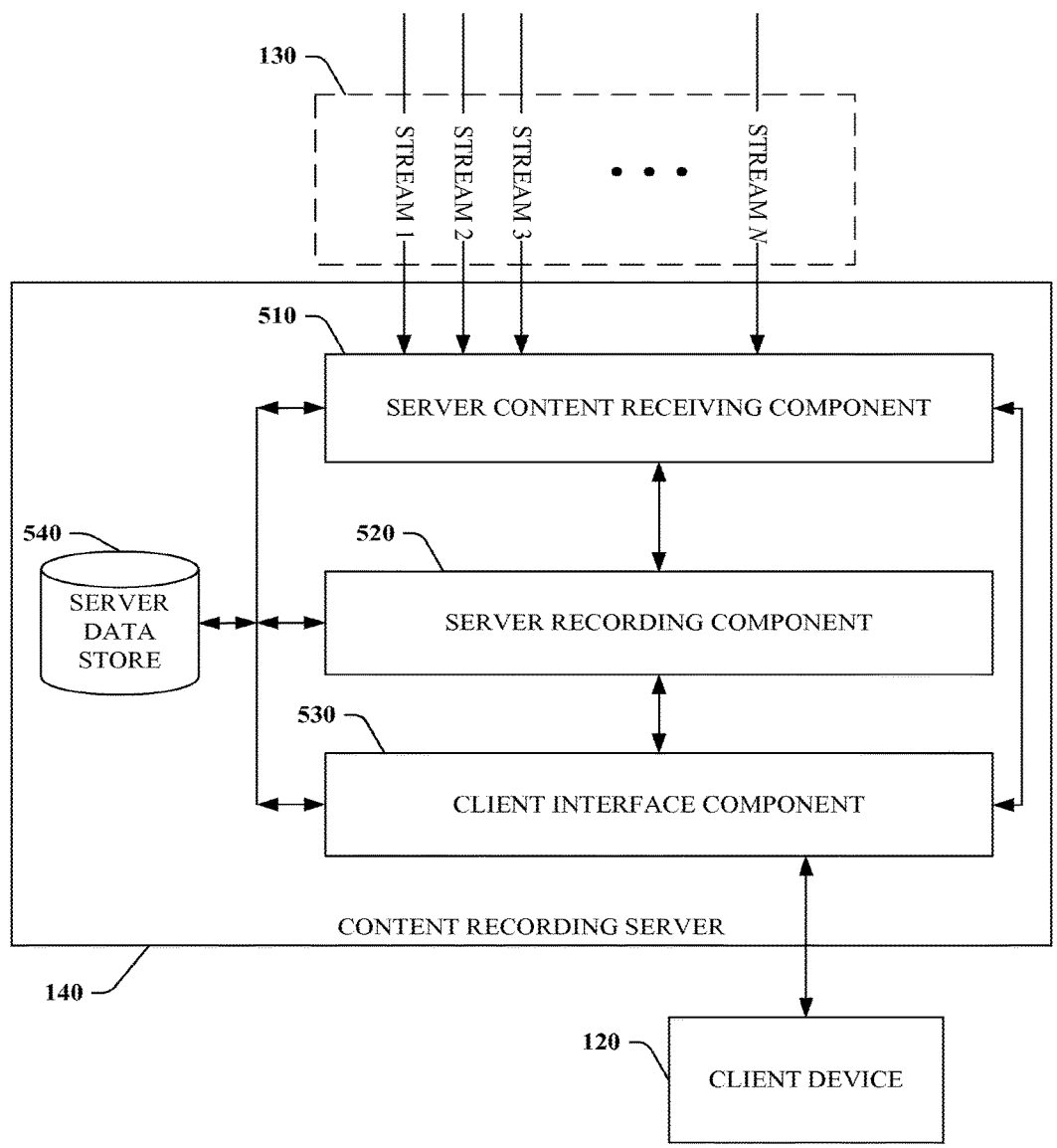
FIG. 5 illustrates a block diagram of an exemplary non-limiting content recording server that records content from a content stream for a client device in accordance with an implementation of this disclosure.

Referring to FIG. 5, content recording server 140 includes a server content receiving component 510 that receives or accesses content on N content streams 130. Content recording server 140 further includes server recording component 520 that records content from the N content streams 130 for client device 120. In addition, content recording server 140 includes a client interface component 530 that interacts with client device 120 to send and/or receive information related to recording content remotely on content recording server 140 for client device 120. Additionally, content recording server 140 includes a server data store 540 that can store content, as well as, data generated or received by content recording server 140, server content receiving component 510, server recording component 520, and client interface component 530. Server data store 540 can be stored on any suitable type of storage device, non-limiting examples of which are illustrated with reference to FIGS. 12 and 13.

Figure 6:
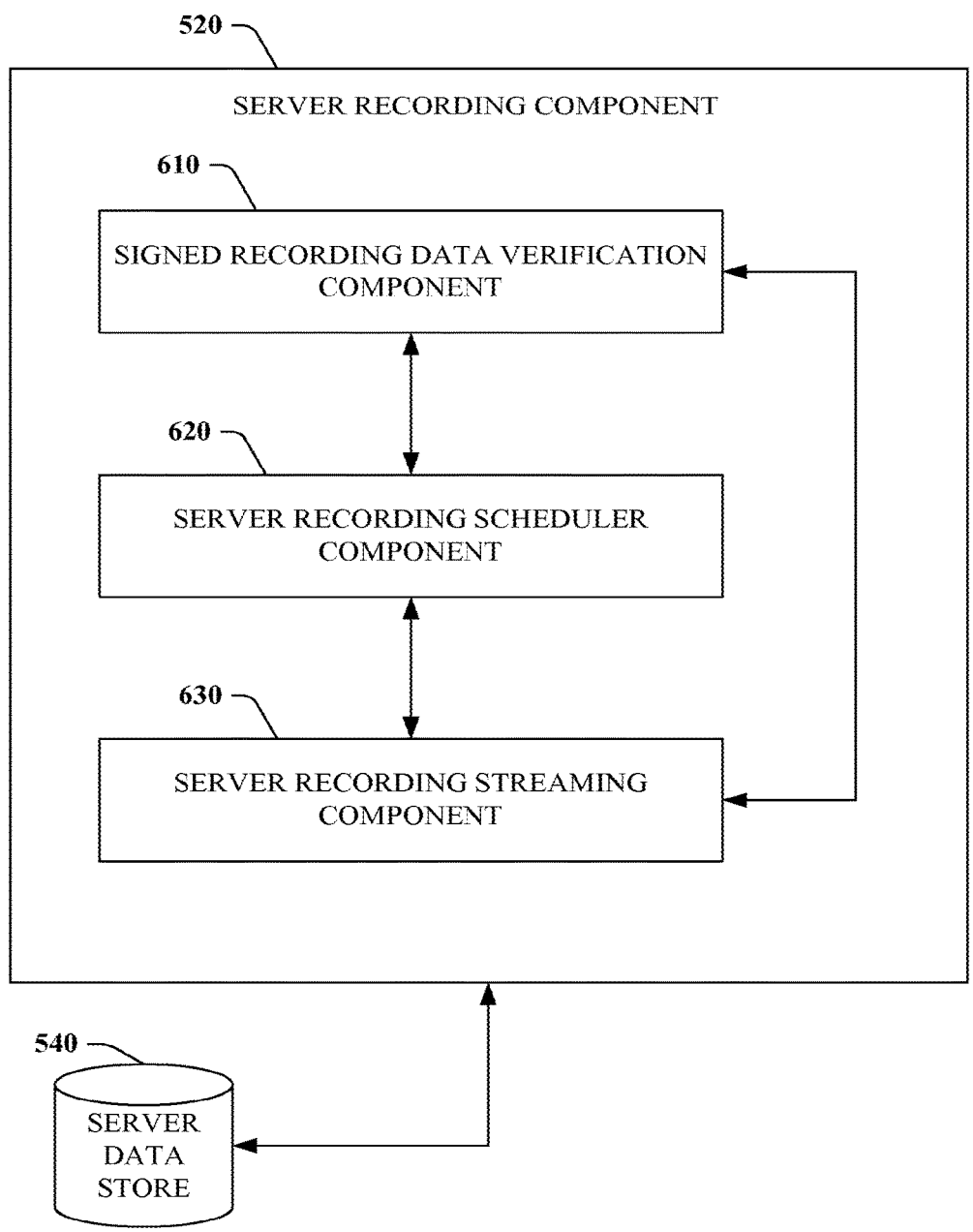
FIG. 6 illustrates a block diagram of an exemplary non-limiting server recording component that manages recording of content from a content stream on a content recording server for a client device in accordance with an implementation of this disclosure.

Referring to FIG. 6, server recording component 520 records content from N content streams 130 for client device 120. Server recording component 520 includes a signed recording data verification component 610 that processes signed recording data received by client interface component 530 related to initiating, continuing, or terminating recording of content.

Signed recording data verification component 610 authenticates the signature of the signed recording data using a corresponding authentication mechanism to the authentication mechanism employed by client device 120 that sent the signed recording data. If the signature is not authentic, signed recording data verification component 610 ignores the signed recording data and content recording server 140 will not take further action associated with recording content indicated in the signed recording data. If the signature is authentic, signed recording data verification component 610 extracts the recording data. If there is no entitlement information included with the recording data, server recording scheduler component 620 will process the recording data. If there is entitlement information included with the recording data, signed recording data verification component 610 will validate the entitlement information with an account system of the content provider to ensure that the client device 120 and/or user account associated with the client device 120 is authorized to record content indicated in the recording data. If the entitlement information is not valid, signed recording data verification component 610 ignores the recording data and content recording server 140 will not take further action associated with recording content indicated in the recording data. If the entitlement information is valid, server recording scheduler component 620 will process the recording data.

Server recording component 520 also includes a server recording scheduler component 620 that manages the initiation, continuation, or termination of recording of content. Server recording scheduler component 620 processes the recording data to determine if a client hash is included with the recording data. If a client hash is included, server recording scheduler component 620 verifies the hash as further detailed below.

Figure 7:
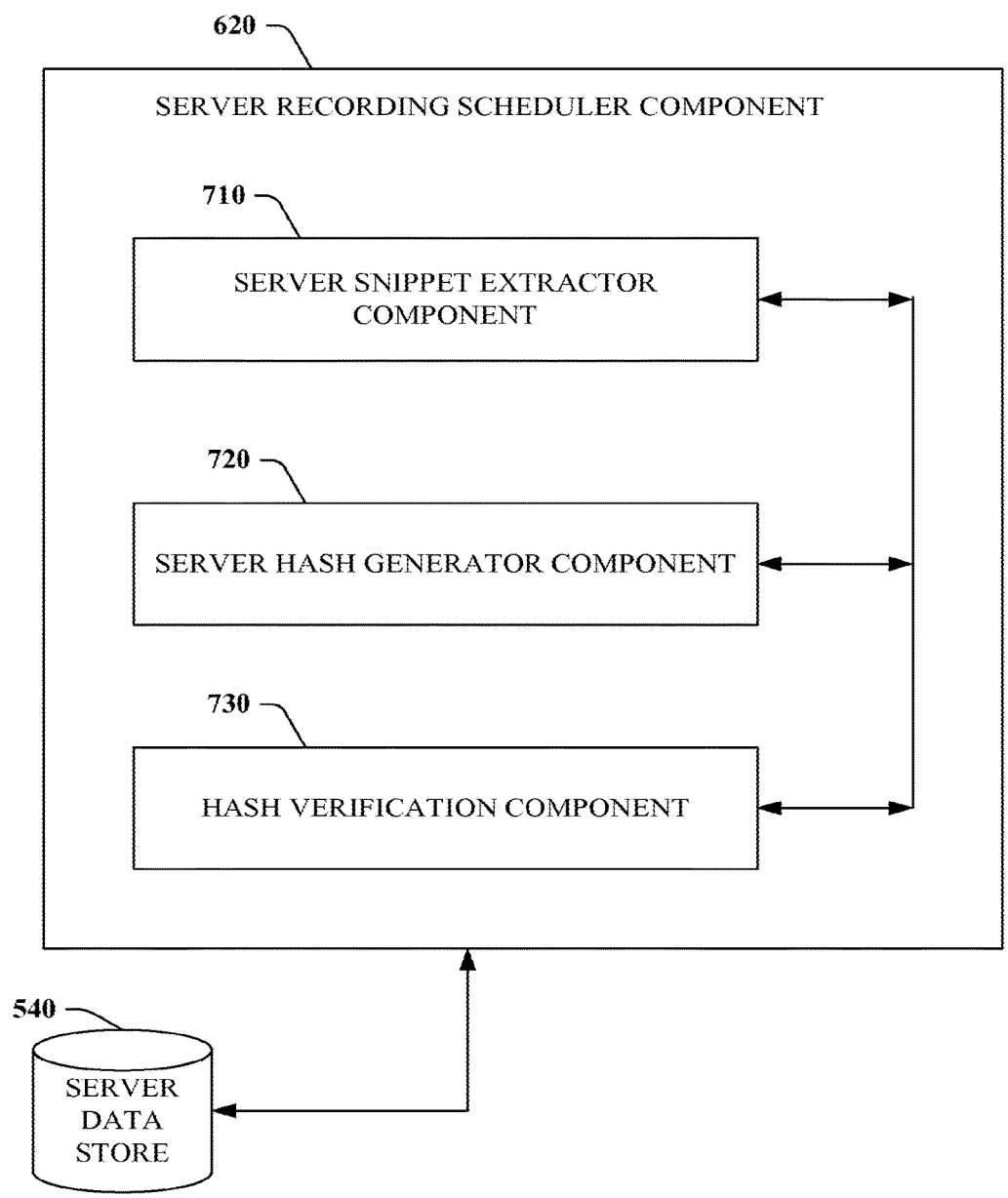
FIG. 7 illustrates a block diagram of an exemplary non-limiting a server recording scheduler component that manages the initiation, continuation, or termination of recording of content from a content stream on a content recording server for a client device in accordance with an implementation of this disclosure.

Referring to FIG. 7, server recording scheduler component 620 includes server snippet extractor component 710 that extracts a snippet of the content from the content recorder server 140 recordings of N content streams 130 corresponding to a content stream, and the starting location and ending location of the snippet in the content stream from which the client hash included in the recording data was generated. It is to be appreciated that the recording data having a client hash also can include at least data indicating the content stream, and the starting location and ending location of the snippet in the content stream. Server recording scheduler component 620 also includes server hash generator component 720 generates a server hash (or fingerprint) of the extracted snippet. Server recording scheduler component 620 also includes hash verification component 730 that compares the client hash to the server hash to determine if they match. If the client hash does not match the server hash, content recording server 140 will not take further action associated with recording content indicated in the recording data. If the client hash matches the server hash, server recording scheduler component 620 will initiate or continue recording content indicated in the recording data.

If a client hash is not included with the recording data, server recording scheduler component 620 terminates an in-progress recording of content indicated in the recording data. In another embodiment, server recording scheduler component 620 terminates an in-progress recording of content indicated in the recording data if a termination parameter is included in the recording data. In a further embodiment, server recording scheduler component 620 terminates an in-progress recording of content if recording data associated with the content is not received from client device 120 within a predetermined period of time. It is to be appreciated that the predetermine period of time can be static or dynamically adjusted, for example based upon speed of a connection employed to communicate with client device, length of the content, the type of client device, or any other suitable attribute associated with client device 120, content recording server 140, or the content.

In an embodiment, recording of content on content recording server 140 for client device 120 includes maintaining a separate copy of the recorded content for client device 120. In another embodiment, recording of content on content recording server 140 for client device 120 includes tagging the content recorder server 140 recordings of N content streams 130 with information corresponding to a segment of a content stream for which the client device 120 is to be recorded. For example, instead of creating a separate copy of the recorded content on content recording server 140 for client device 120, the content stream from which the server hash is generated is tagged with client device information indicating the client device 120 or user account associated with the client device 120 and the portion of the stream that the client device 120 or the user account associated with client device 120 would like future access. As such, storage requirements on content recording server 140 can be greatly reduced.

Referring back to FIG. 6, server recording component 520 also includes server recording streaming component 630 that interacts with client device 120 to provide content recorded on content recording server 140 to client device 120. For example, client device 120 can communicate to content recording server 140 a request indicating a stored content recording for client device 120 that client device 120 would like to receive. Server recording streaming component 630 can stream or deliver the requested stored content recording to client device 120.

FIGS. 8-11 illustrate various methodologies in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

Figure 8:
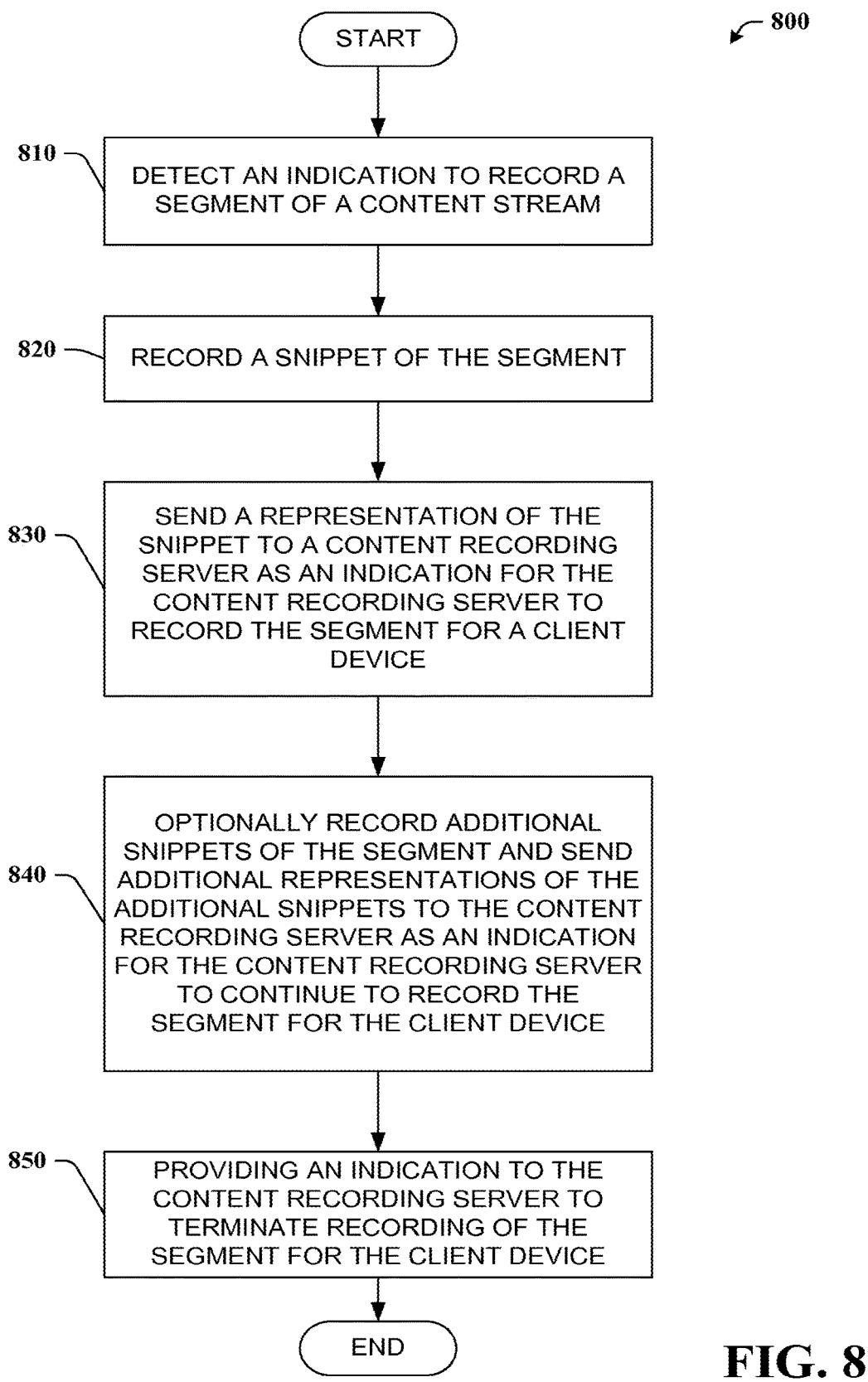
FIG. 8 illustrates an exemplary non-limiting flow diagram for a client device to provide an indication for a content recording server to record a segment of content from a content stream for the client device in accordance with an implementation of this disclosure.

Referring to FIG. 8, an exemplary method 800 for a client device to provide an indication for a content recording server to record a segment of content from a content stream for the client device is depicted. At reference numeral 810, an indication to record a segment of a content stream for a client device is detected (e.g. by a user interface component 310, client recording scheduler component 320, client recording component 220, or client device 120). At reference numeral 820, a snippet of the segment is recorded (e.g. by a client snippet extractor component 410, client signed recording data component 330, client recording scheduler component 320, client recording component 220, or client device 120). At reference numeral 830, a representation of the snippet is sent to a content recording server as an indication for the content recording server to record the segment for a client device (e.g. by a client snippet extractor component 410, client hash generator component 420, client data signing component 430, client signed recording data component 330, client recording scheduler component 320, client recording component 220, server interface component 230, or client device 120). At reference numeral 840, an optional act can be performed of recording additional snippets of the segment and sending additional representations of the additional snippets to the content recording server as an indication for the content recording server to continue to record the segment for the client device (e.g. by a client snippet extractor component 410, client hash generator component 420, client data signing component 430, client signed recording data component 330, client recording scheduler component 320, client recording component 220, server interface component 230, or client device 120). At reference numeral 850, an indication is provided to the content recording server to terminate recording of the segment for the client device (e.g. by a client data signing component 430, client signed recording data component 330, client recording scheduler component 320, client recording component 220, server interface component 230, or client device 120).

Figure 9:
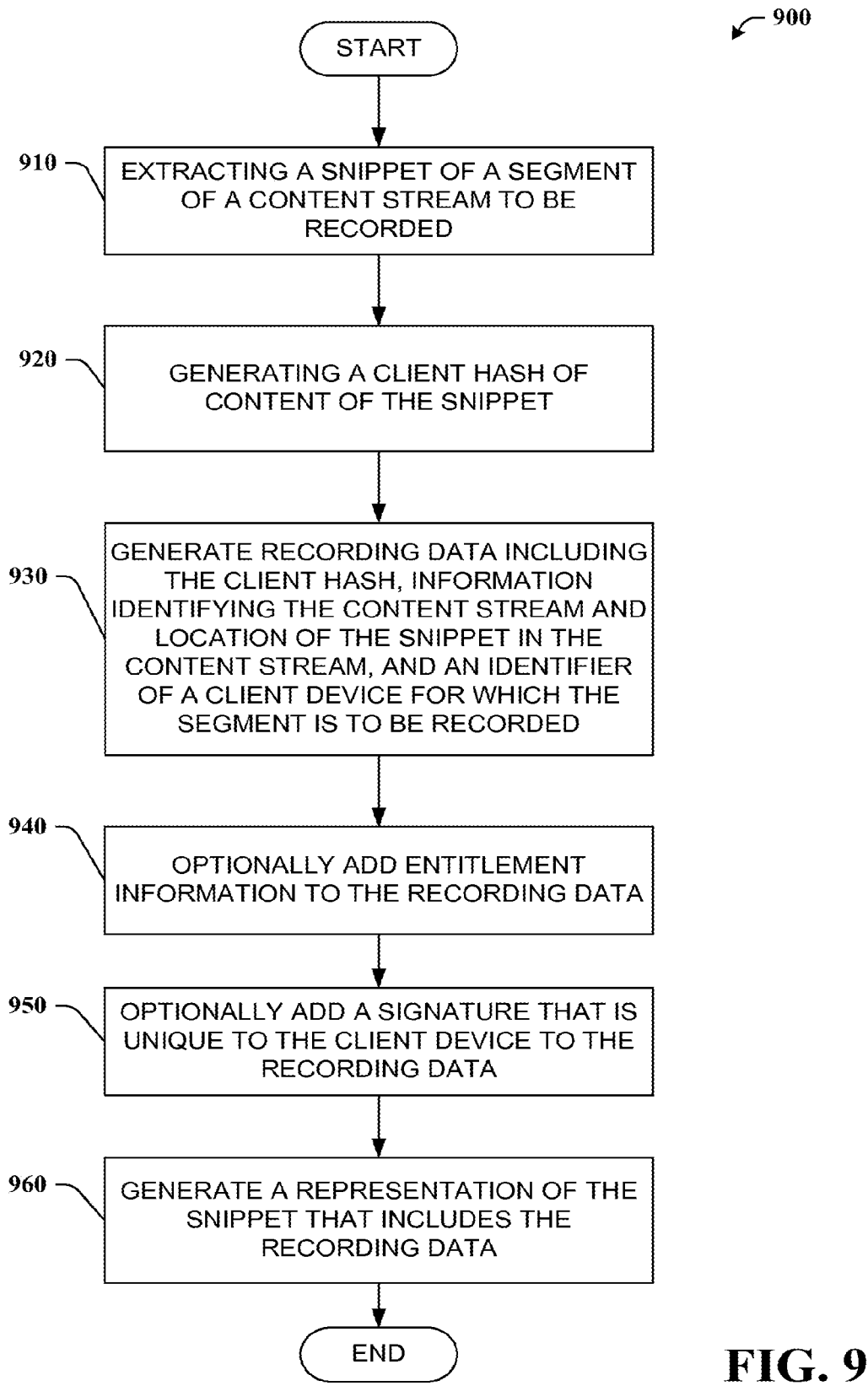
FIG. 9 illustrates an exemplary non-limiting flow diagram for a client device to generate a representation of a snippet of a segment of content of a content stream to be recorded in accordance with an implementation of this disclosure.

Referring to FIG. 9, an exemplary method 900 for a client device to generate a representation of a snippet of a segment of content of a content stream to be recorded is depicted. At reference numeral 910, a snippet of the segment is recorded (e.g. by a client snippet extractor component 410, client signed recording data component 330, client recording scheduler component 320, client recording component 220, or client device 120). At reference numeral 920, a hash (e.g. client hash) of the snippet is generated (e.g. by a client hash generator component 420, client signed recording data component 330, client recording scheduler component 320, client recording component 220, or client device 120). At reference numeral 930, recording data is generated including, for example, the client hash, information identifying the content stream and location of the snippet in the content stream, and/or an identifier of a client device for which the segment is to be recorded (e.g. by a client signed recording data component 330, client recording scheduler component 320, client recording component 220, or client device 120). At reference numeral 940, an optional act can be performed of adding entitlement information to the recording data (e.g. by a client data signing component 430, client signed recording data component 330, client recording scheduler component 320, client recording component 220, or client device 120). At reference numeral 950, an optional act can be performed of adding a signature to the recording data that is unique to the client device (e.g. by a client data signing component 430, client signed recording data component 330, client recording scheduler component 320, client recording component 220, or client device 120). At reference numeral 960, a representation of the snippet that includes the recording data is generated (e.g. by a client data signing component 430, client signed recording data component 330, client recording scheduler component 320, client recording component 220, server interface component 230, or client device 120).

Figure 10A:
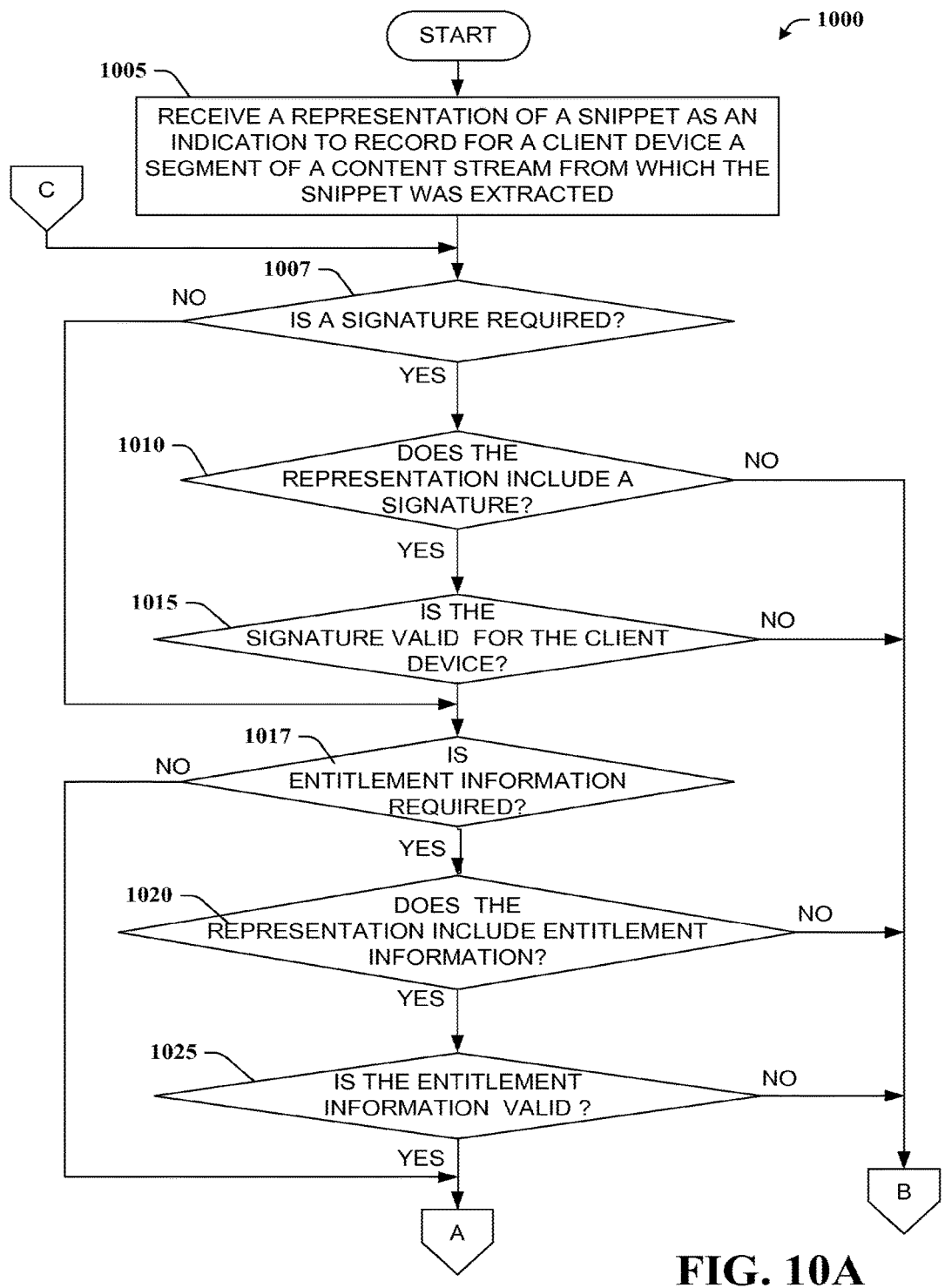
FIGS. 10A, 10B, and 10C illustrates an exemplary non-limiting flow diagram for a content recording server to record a segment of content from a content stream for a client device in accordance with an implementation of this disclosure.
Figure 10B:
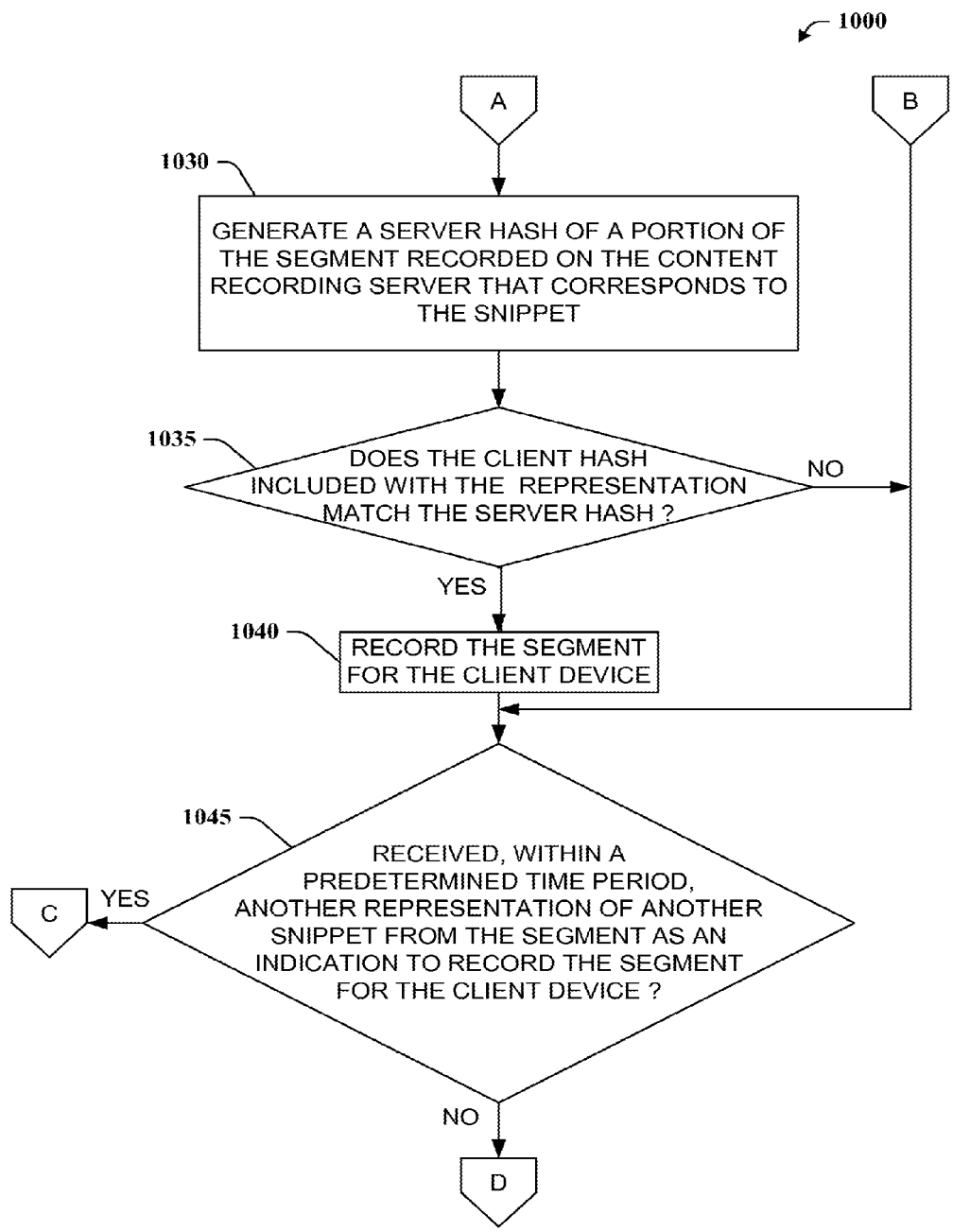
Figure 10C:
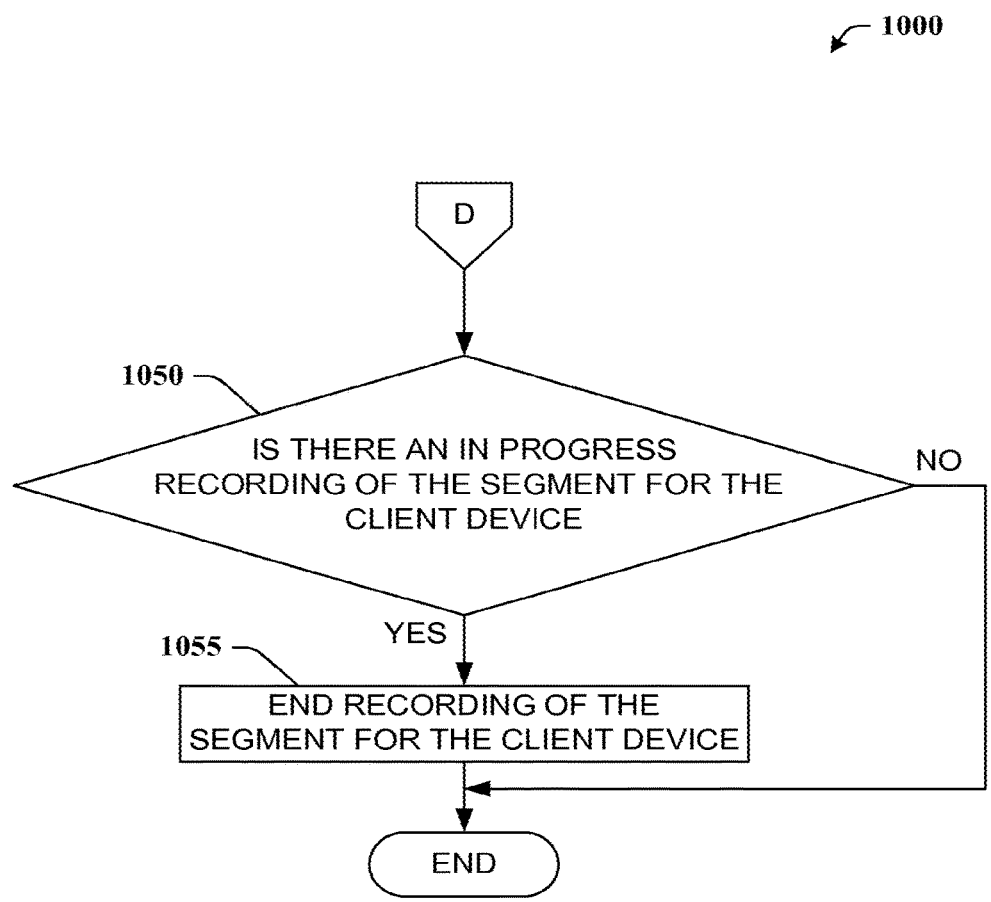

Referring to FIGS. 10A, 10B, and 10C, an exemplary method 1000 for a content recording server to record a segment of content from a content stream for a client device is depicted. At reference numeral 1005, a representation of a snippet is received from a client device as an indication for the content recording server to record a segment of a content stream from which the snippet was extracted for the client device (e.g. by a client interface component 530 or content recording server 140). At reference numeral 1007, a determination is made whether a signature is required with the representation. (e.g. by a signed recording data verification component 610, server recording component 520, or content recording server 140). If the determination at 1007 is "NO" meaning that a signature is not required with the representation, the method proceeds to element 1017. If the determination at 1007 is "YES" meaning that a signature is required with the representation, the method proceeds to element 1010. At reference numeral 1010, a determination is made whether the representation includes a signature (e.g. by a signed recording data verification component 610, server recording component 520, or content recording server 140). If the determination at 1010 is "NO" meaning that the representation does not include a signature, the method proceeds to element 1045. If the determination at 1010 is "YES" meaning that the representation does include a signature, the method proceeds to element 1015. At reference numeral 1015, a determination is made whether the signature is valid for the client device (e.g. by a signed recording data verification component 610, server recording component 520, or content recording server 140). If the determination at 1015 is "NO" meaning that the signature is not valid, the method proceeds to element 1045. If the determination at 1015 is "YES" meaning that the signature is valid, the method proceeds to element 1017. At reference numeral 1017, a determination is made whether entitlement information is required with the representation. (e.g. by a signed recording data verification component 610, server recording component 520, or content recording server 140). If the determination at 1017 is "NO" meaning that entitlement information is not required with the representation, the method proceeds to element 1030. If the determination at 1017 is "YES" meaning that entitlement information is required with the representation, the method proceeds to element 1020. At reference numeral 1020, a determination is made whether the representation includes entitlement information (e.g. by a signed recording data verification component 610, server recording component 520, or content recording server 140). If the determination at 1020 is "NO" meaning that the representation does not include entitlement information, the method proceeds to element 1045. If the determination at 1010 is "YES" meaning that the representation does include entitlement information, the method proceeds to element 1025. At reference numeral 1025, a determination is made whether the entitlement information is valid for the client device or a user account associated with the client device (e.g. by a signed recording data verification component 610, server recording component 520, or content recording server 140). If the determination at 1025 is "NO" meaning that the entitlement information is not valid for the client device or a user account associated with the client device, the method proceeds to element 1045. If the determination at 1025 is "YES" meaning that the entitlement information is valid for the client device or a user account associated with the client device, the method proceeds to element 1030. At reference numeral 1030, a hash (e.g. server hash) is generated of a portion (e.g. server snippet) of the segment recorded on the content recording server that corresponds to the snippet (e.g. by a server snippet extractor component 710, server hash generator component 720, server recording scheduler component 620, a server recording component 520, content recording server 140). At reference numeral 1035, a determination is made whether the server hash matches a client hash included with the representation (e.g. by a hash verification component 730, server recording scheduler component 620, a server recording component 520, content recording server 140). If the determination at 1035 is "NO" meaning that the server hash does not match the client hash, the method proceeds to element 1045. If the determination at 1035 is "YES" meaning that the server hash does match the client hash, the method proceeds to element 1040. At reference numeral 1040, recording of the segment is initiated or continued on the content recording server for the client device (e.g. by a server recording scheduler component 620, a server recording component 520, content recording server 140). At reference numeral 1045, a determination is made whether another representation of another snippet from the segment is received from the client device as an indication for the content recording server to record the segment of the content stream from which the snippet was extracted for the client device (e.g. by a server recording scheduler component 620, a server recording component 520, a client interface component 530, or content recording server 140). If the determination at 1045 is "NO" meaning that another representation of another snippet from the segment is not received from the client device, the method proceeds to element 1050. If the determination at 1045 is "YES" meaning that another representation of another snippet from the segment is received from the client device, the method proceeds to element 1010. At reference numeral 1050, a determination is made whether there is an in progress recording of the segment for the client device (e.g. by a server recording scheduler component 620, a server recording component 520, or content recording server 140). If the determination at 1050 is "NO" meaning that there is not an in progress recording of the segment for the client device, the method ends. If the determination at 1050 is "YES" meaning that there is an in progress recording of the segment for the client device, the method proceeds to element 1055. At reference numeral 1055, the in progress recording of the segment for the client device is terminated (e.g. by a server recording scheduler component 620, a server recording component 520, or content recording server 140)

Figure 11:
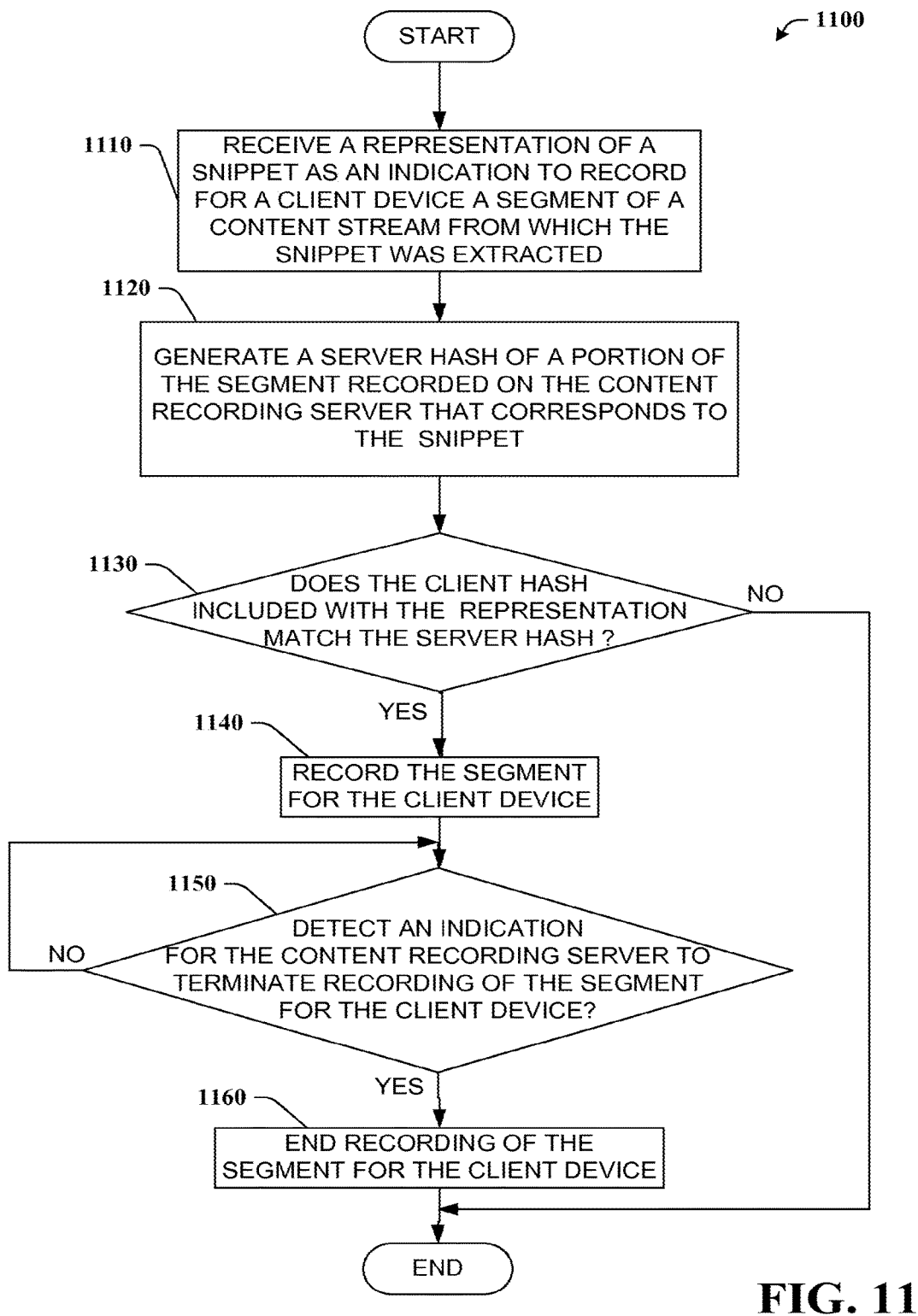
FIG. 11 illustrates an exemplary non-limiting flow diagram for a content recording server to record a segment of content from a content stream for a client device in accordance with an implementation of this disclosure.

Referring to FIG. 11, an exemplary method 1100 for a content recording server to record a segment of content from a content stream for a client device is depicted. At reference numeral 1110, a representation of a snippet is received from a client device as an indication for the content recording server to record a segment of a content stream from which the snippet was extracted for the client device (e.g. by a client interface component 530 or content recording server 140). At reference numeral 1120, a hash (e.g. server hash) is generated of a portion (e.g. server snippet) of the segment recorded on the content recording server that corresponds to the snippet (e.g. by a server snippet extractor component 710, server hash generator component 720, server recording scheduler component 620, a server recording component 520, content recording server 140). At reference numeral 1130, a determination is made whether the server hash matches a client hash included with the representation (e.g. by a hash verification component 730, server recording scheduler component 620, a server recording component 520, content recording server 140). If the determination at 1130 is "NO" meaning that the server hash does not match the client hash, the method ends. If the determination at 1130 is "YES" meaning that the server hash does match the client hash, the method proceeds to element 1140. At reference numeral 1140, recording of the segment is initiated on the content recording server for the client device (e.g. by a server recording scheduler component 620, a server recording component 520, content recording server 140). At reference numeral 1150, a determination is made whether an indication is detected for the content recording server to terminate recording of the segment for the client device (e.g. by a server recording scheduler component 620, a server recording component 520, a client interface component 530, or content recording server 140). If the determination at 1140 is "NO" meaning that an indication is not detected for the content recording server to terminate recording of the segment for the client device, the method proceeds to element 1150. If the determination at 1140 is "YES" meaning that an indication is detected for the content recording server to terminate recording of the segment for the client device, the method proceeds to element 1160. At reference numeral 1160, the recording of the segment for the client device is terminated (e.g. by a server recording scheduler component 620, a server recording component 520, or content recording server 140)

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 12:
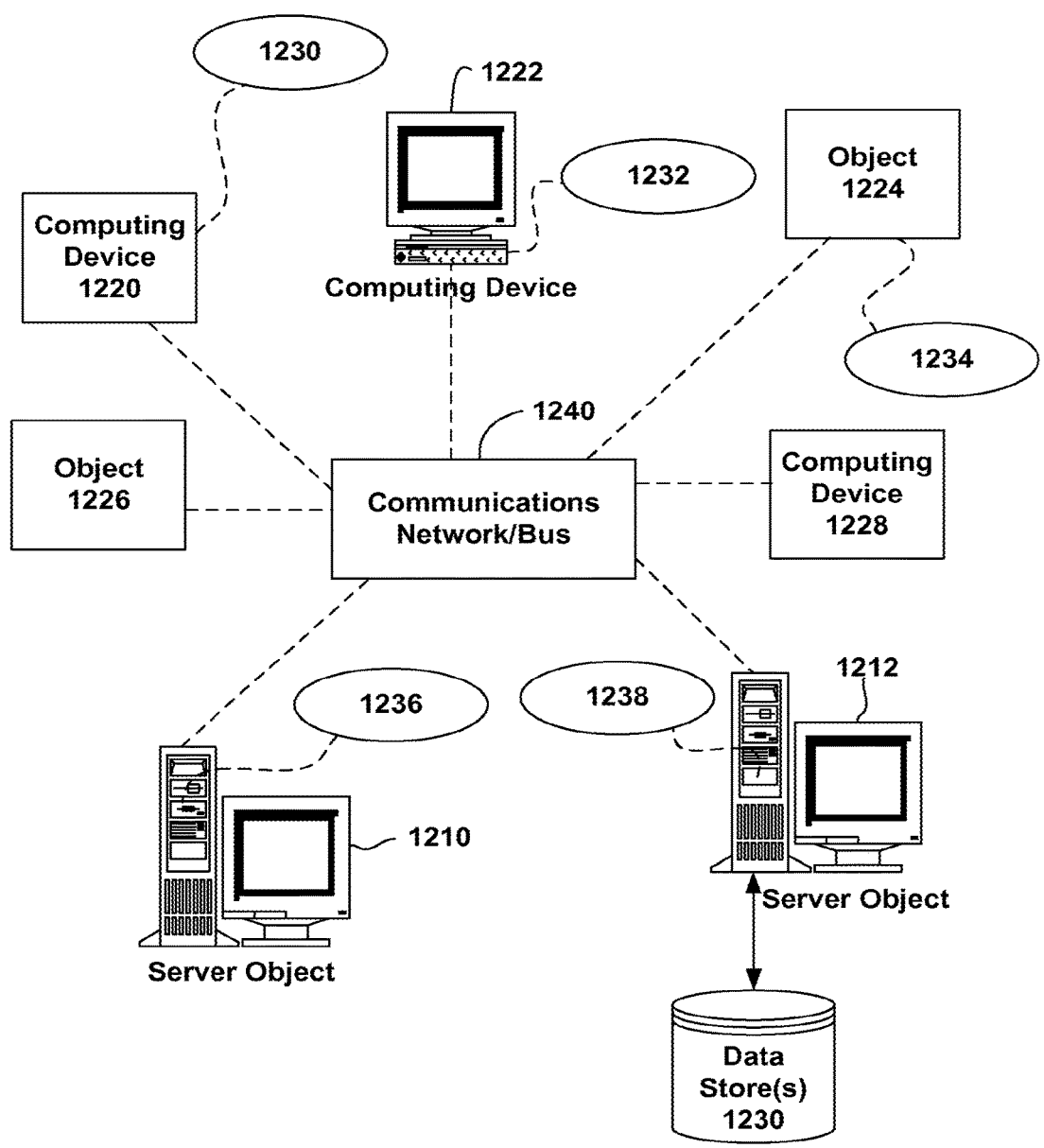
FIG. 12 illustrates a block diagram of an exemplary non-limiting networked environment in which the various embodiments can be implemented.

FIG. 12 provides a schematic diagram of an exemplary networked or distributed computing environment. The distributed computing environment comprises computing objects 1210, 1212, etc. and computing objects or devices 1220, 1222, 1224, 1226, 1228, etc., which may include programs, methods, data stores, programmable logic, etc., as represented by applications 1230, 1232, 1234, 1236, 1238. It can be appreciated that computing objects 1210, 1212, etc. and computing objects or devices 1220, 1222, 1224, 1226, 1228, etc. may comprise different devices, such as personal digital assistants (PDAs), audio/video devices, mobile phones, MP3 players, personal computers, laptops, tablets, etc.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1240, either directly or indirectly. Even though illustrated as a single element in FIG. 12, network 1240 may comprise other computing objects and computing devices that provide services to the system of FIG. 12, and/or may represent multiple interconnected networks, which are not shown. Each computing object 1210, 1212, etc. or computing objects or devices 1220, 1222, 1224, 1226, 1228, etc. can also contain an application, such as applications 1230, 1232, 1234, 1236, 1238, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 12, as a non-limiting example, computing objects or devices 1220, 1222, 1224, 1226, 1228, etc. can be thought of as clients and computing objects 1210, 1212, etc. can be thought of as servers where computing objects 1210, 1212, etc. provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 1240 is the Internet, for example, the computing objects 1210, 1212, etc. can be Web servers, file servers, media servers, etc. with which the client computing objects or devices 1220, 1222, 1224, 1226, 1228, etc. communicate via any of a number of known protocols, such as the hypertext transfer protocol (HTTP). Objects 1210, 1212, etc. may also serve as client computing objects or devices 1220, 1222, 1224, 1226, 1228, etc., as may be characteristic of a distributed computing environment.

Exemplary Computing Device

As mentioned, advantageously, the techniques described herein can be applied to any suitable device. It is to be understood, therefore, that handheld, portable and other computing devices and computing objects of all kinds are contemplated for use in connection with the various embodiments. Accordingly, the computer described below in FIG. 13 is but one example of a computing device that can be employed with implementing one or more of the systems or methods shown and described in connection with FIGS. 1-8 Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 13 thus illustrates an example of a suitable computing system environment 1300 in which one or aspects of the embodiments described herein can be implemented, although as made clear above, the computing system environment 1300 is only one example of a suitable computing environment and is not intended to suggest any limitation as to scope of use or functionality. Neither is the computing environment 1300 be interpreted as having any dependency or requirement relating to any one or combination of components illustrated in the exemplary operating environment 1300.

With reference to FIG. 13, an exemplary computing device for implementing one or more embodiments in the form of a computer 1310 is depicted. Components of computer 1310 may include, but are not limited to, a processing unit 1320, a system memory 1330, and a system bus 1322 that couples various system components including the system memory to the processing unit 1320.

Computer 1310 typically includes a variety of computer readable media and can be any available media that can be accessed by computer 1310. The system memory 1330 may include computer storage media in the form of volatile and/or nonvolatile memory such as read only memory (ROM) and/or random access memory (RAM). By way of example, and not limitation, system memory 1330 may also include an operating system, application programs, other program modules, and program data.

A user can enter commands and information into the computer 1310 through input devices 1340, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 1310. A monitor or other type of display device is also connected to the system bus 1322 via an interface, such as output interface 1350. In addition to a monitor, computers can also include other peripheral output devices such as speakers and a printer, which may be connected through output interface 1350.

The computer 1310 may operate in a networked or distributed environment using logical connections to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1372, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g. inferring relationships between metadata or inferring topics of interest to users), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, as by $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A method, comprising:
receiving, by a client device, an instruction to record a video program;
receiving, by the client device, a content stream from a content provider, wherein the content stream includes the video program to be recorded;
sending, by the client device, a request to a content recording system comprising one or more servers to record the video program;
recording, by the client device, a first snippet of video content from a first portion of the content stream corresponding to a first portion of the video program;
generating, by the client device, a representation of the first snippet based at least in part on the video content recorded in the first snippet;
sending, by the client device, the representation of the first snippet to the content recording system as evidence that the client device had unencrypted access to the first portion of the content stream;
recording, by the client device, a second snippet of video content from a second portion of the content stream corresponding to a second portion of the video program, wherein the second portion of the video program is non-contiguous with the first portion;
generating, by the client device, a representation of the second snippet based at least in part on the video content recorded in the second snippet;
sending, by the client device, the representation of the second snippet to the content recording system as evidence that the client device had unencrypted access to the second portion of the content stream and a portion of the content stream between the first portion of the content stream and the second portion of the content stream; and
receiving, from the content recording system, access to playback at least the first portion of the content stream, the second portion of the content stream, and the portion of the content stream between the first portion of the content stream and the second portion of the content stream based on the representation of the first snippet and the representation of the second snippet sent to the content recording system.

2. The method of claim 1, comprising:
receiving, by the client device, an instruction to record a second video program at least a portion of which is broadcast at the same time as at least a portion of the video program;
tuning, by the client device, to a second content stream that includes the second video program to be recorded from the content provider during the portion of the content stream corresponding to the video program between the first portion of the content stream and the second portion of the content stream;
in response to tuning to the second content stream, receiving, by the client device, the second content stream;
sending, by the client device, a request to the content recording system to record the second video program;
recording, by the client device, a third snippet of video content from a first portion of the second content stream corresponding to a first portion of the second video program;
generating, by the client device, a representation of the third snippet based at least in part on the video content recorded in the third snippet; and
sending, by the client device, the representation of the third snippet to the content recording system as evidence that the client device had unencrypted access to at least the first portion of the second content stream.

3. The method of claim 1, further comprising generating the representation of the first snippet using at least information identifying the content stream, information identifying a location of the first snippet in the content stream, and an identifier of the client device.

4. The method of claim 3, wherein generating the representation further comprises signing the recording data with an authentication mechanism unique to the client device.

5. The method of claim 1, further comprising inhibiting the client device from recording another snippet of the video content from a third portion of the content stream corresponding to a third portion of the video program subsequent to sending the second snippet, wherein the content recording system is configured to inhibit recording of the video program for the client device after a predetermined amount of time passes without receiving a representation of a snippet of the video program from the client device.

6. A client device, comprising:
a memory; and
a processor that, when executing computer executable instruction stored in the memory, is programmed to:
receive an instruction to record a video program;
receive a content stream from a content provider, wherein the content stream includes the video program to be recorded;
send a request to a content recording system comprising at least one server to record the video program;
record a first snippet of video content from a first portion of the content stream corresponding to a first portion of the video program;
generate a representation of the first snippet based at least in part on the video content recorded in the first snippet;
send the representation of the first snippet to the content recording system as evidence that the client device had unencrypted access to the first portion of the content stream;
record a second snippet of video content from a second portion of the content stream corresponding to a second portion of the video program, wherein the second portion of the video program is non-contiguous with the first portion;
generate a representation of the second snippet based at least in part on the video content recorded in the second snippet;
send the representation of the second snippet to the content recording system as evidence that the client device had unencrypted access to the second portion of the content stream and a portion of the content stream between the first portion of the content stream and the second portion of the content stream; and
receive, from the content recording system, access to playback at least the first portion of the content stream, the second portion of the content stream, and the portion of the content stream between the first portion of the content stream and the second portion of the content stream based on the representation of the first snippet and the representation of the second snippet sent to the content recording system.

7. The client device of claim 6, wherein the processor is further programmed to:
receive an instruction to record a second video program at least a portion of which is broadcast at the same time as at least a portion of the video program;
tune to a second content stream that includes the second video program to be recorded from the content provider during the portion of the content stream corresponding to the video program between the first portion of the content stream and the second portion of the content stream;
in response to tuning to the second content stream, receive the second content stream;
send a request to the content recording system to record the second video program;
record a third snippet of video content from a first portion of the second content stream corresponding to a first portion of the second video program;
generate a representation of the third snippet based at least in part on the video content recorded in the third snippet; and
send the representation of the third snippet to the content recording system as evidence that the client device had unencrypted access to the first portion of the second content stream.

8. The client device of claim 6, wherein the processor is further programmed to generate the representation of the first snippet using at least information identifying the content stream, information identifying a location of the first snippet in the content stream, and an identifier of the client device.

9. The client device of claim 8, wherein the processor is further programmed to sign the recording data with an authentication mechanism unique to the client device.

10. The client device of claim 6, wherein the processor is further programmed to inhibit recording of another snippet of the video content from a third portion of the content stream corresponding to a third portion of the video program subsequent to sending the second snippet, wherein the content recording system is configured to stop recording the video program for the client device after a predetermined amount of time passes without receiving a representation of a snippet of the video program from the client device.

11. A method, comprising:
receiving, by a content recording system comprising at least one server, a content stream that includes a video program;
receiving, by the content recording system, a request to record the video program for a client device;
receiving, by the content recording system, a representation of a first snippet of video content recorded by the client device from a first portion of the content stream corresponding to a first portion of the video program;
recording, by the content recording system, a segment of the content stream corresponding to the video program;
determining, by the content recording system, a location of the first portion of the content stream based on the representation of the first snippet;
generating, by the content recording system, a representation of a second snippet of the content stream, wherein the location of the second snippet is based on the location of the first snippet;
comparing, by the content recording system, the representation of the second snippet to at least a portion of the representation of the first snippet;
determining, by the content recording system, that the client device had unencrypted access to at least the first portion of the content stream based on the comparison of the representation of the second snippet to at least a portion of the representation of the first snippet;
recording, by the content recording system, at least the first portion of the content stream for the client device based on the determination that the client device had unencrypted access to the first portion of the content stream;
receiving, by the content recording system, a representation of a third snippet of video content recorded by the client device from a second portion of the content stream corresponding to a second portion of the video program, wherein the second portion of the video program is non-contiguous with the first portion;
determining, by the content recording system, a location of the second portion of the content stream based on the representation of the third snippet;
generating, by the content recording system, a representation of a fourth snippet of the content stream, wherein the location of the fourth snippet is based on the location of the third snippet;
comparing, by the content recording system, the representation of the fourth snippet to at least a portion of the representation of the third snippet;
determining, by the content recording system, that the client device had unencrypted access to at least the second portion of the content stream and a portion of the content stream between the first portion of the content stream and the second portion of the content stream based on the comparison of the representation of the fourth snippet to at least a portion of the representation of the third snippet;
recording, by the content recording system, at least the second portion of the content stream and the portion of the content stream between the first portion of the content stream and the second portion of the content stream for the client device based on the determination that the client device had unencrypted access to the second portion of the content stream and the portion of the content stream between the first portion of the content stream and the second portion of the content stream; and
providing the client device with access to playback at least the first portion of the content stream, the second portion of the content stream, and the portion of the content stream between the first portion of the content stream and the second portion of the content stream from the content recording system based on the determinations that the client device has unencrypted access.

12. The method of claim 11, comprising:
receiving, by the content recording system, a second content stream that includes a second video program at least a portion of which is broadcast at the same time as at least a portion of the video program;
receiving, by the content recording system, a request to record the second video program for a client device;
receiving, by the content recording system, a representation of a fifth snippet of video content recorded by the client device from a first portion of the second content stream corresponding to a first portion of the second video program between the first portion of the content stream and the second portion of the content stream;

recording, by the content recording system, a segment of the second content stream corresponding to the second video program;
determining, by the content recording system, a location of the first portion of the second content stream based on the representation of the fifth snippet;
generating, by the content recording system, a representation of a sixth snippet of the second content stream, wherein the location of the sixth snippet is based on the location of the fifth snippet;
comparing, by the content recording system, the representation of the sixth snippet to at least a portion of the representation of the fifth snippet;
determining, by the content recording system, that the client device had unencrypted access to at least the first portion of the second content stream based on the comparison of the representation of the sixth snippet to at least a portion of the representation of the fifth snippet; and
recording, by the content recording system, at least the first portion of the second content stream for the client device based on the determination that the client device had unencrypted access to the first portion of the second content stream.

13. The method of claim 11, wherein the representation of the first snippet represents at least information identifying the content stream, information identifying a location of the snippet in the content stream, and an identifier of the client device.

14. The method of claim 13, wherein the representation of the first snippet is signed using with an authentication mechanism unique to the client device.

15. The method of claim 11, further comprising:
determining, by the content recording system, that another snippet of the video content from a third portion of the content stream corresponding to a third portion of the video program has not been received within a predetermined period of time subsequent to receiving the second snippet; and
in response to determining that another snippet has not been received, inhibiting, by the content recording system, at least the third portion of the video program from being recorded for the client device.

16. A content recording system, comprising:
a memory; and
one or more processors that, when executing computer executable instruction stored in the memory, are programmed to:
receive a content stream that includes a video program;
receive a request to record the video program for a client device;
receive a representation of a first snippet of video content recorded by the client device from a first portion of the content stream corresponding to a first portion of the video program;
record a segment of the content stream corresponding to the video program;
determine a location of the first portion of the content stream based on the representation of the first snippet;
generate a representation of a second snippet of the content stream, wherein the location of the second snippet is based on the location of the first snippet;
compare the representation of the second snippet to at least a portion of the representation of the first snippet;
determine that the client device had unencrypted access to at least the first portion of the content stream based on the comparison of the representation of the second snippet to at least a portion of the representation of the first snippet;
record at least the first portion of the content stream for the client device based on the determination that the client device had unencrypted access to the first portion of the content stream;
receive a representation of a third snippet of video content recorded by the client device from a second portion of the content stream corresponding to a second portion of the video program, wherein the second portion of the video program is non-contiguous with the first portion;
determine a location of the second portion of the content stream based on the representation of the third snippet;
generate a representation of a fourth snippet of the content stream, wherein the location of the fourth snippet is based on the location of the third snippet;
compare the representation of the fourth snippet to at least a portion of the representation of the third snippet;
determine that the client device had unencrypted access to at least the second portion of the content stream and a portion of the content stream between the first portion of the content stream for the client device and the second portion of the content stream based on the comparison of the representation of the fourth snippet to at least a portion of the representation of the third snippet;
record at least the second portion of the content stream and portion of the content stream between the first portion of the content stream and the second portion of the content stream based on the determination that the client device had unencrypted access to the second portion of the content stream and the portion of the content stream between the first portion of the content stream and the second portion of the content stream; and
provide the client device with access to playback at least the first portion of the content stream, the second portion of the content stream, and the portion of the content stream between the first portion of the content stream and the second portion of the content stream from the content recording system based on the determinations that the client device has unencrypted access.

17. The content recording system of claim 16, wherein the one or more processors are further programmed to:
receive a second content stream that includes a second video program at least a portion of which is broadcast at the same time as at least a portion of the video program;
receive a request to record the second video program for a client device;
receive a representation of a fifth snippet of video content recorded by the client device from a first portion of the second content stream corresponding to a first portion of the second video program;
record a segment of the second content stream corresponding to the second video program;
determine a location of the first portion of the second content stream based on the representation of the fifth snippet;

generate a representation of a sixth snippet of the second content stream, wherein the location of the sixth snippet is based on the location of the fifth snippet;

compare the representation of the sixth snippet to at least a portion of the representation of the fifth snippet;

determine that the client device had unencrypted access to at least the first portion of the second content stream based on the comparison of the representation of the sixth snippet to at least a portion of the representation of the fifth snippet; and record at least the first portion of the second content stream for the client device based on the determination that the client device had unencrypted access to the first portion of the second content stream.

18. The content recording system of claim 16, wherein the representation of the first snippet represents at least information identifying the content stream, information identifying a location of the snippet in the content stream, and an identifier of the client device.

19. The content recording system of claim 18, wherein the representation of the first snippet is signed using with an authentication mechanism unique to the client device.

20. The content recording system of claim 16, wherein the one or more processors are further programmed to:

determine that another snippet of the video content from a third portion of the content stream corresponding to a third portion of the video program has not been received within a predetermined period of time subsequent to receiving the second snippet; and in response to determining that another snippet has not been received, inhibit at least the third portion of the video program from being recorded for the client device.

\* \* \* \* \*